(12) United States Patent
Saito et al.

(10) Patent No.: US 8,323,811 B2
(45) Date of Patent: Dec. 4, 2012

(54) LEAD ACID STORAGE BATTERY

(75) Inventors: Kazuma Saito, Kyoto (JP); Kenji Hirakawa, Kyoto (JP); Motoshi Kiribayashi, Kyoto (JP)

(73) Assignee: GS Yuasa International Ltd., Kyoto-Shi (JP)

( * ) Notice: Subject to any disclaimer, the term of this patent is extended or adjusted under 35 U.S.C. 154(b) by 968 days.

(21) Appl. No.: 12/309,864

(22) PCT Filed: Aug. 3, 2007

(86) PCT No.: PCT/JP2007/065281
§ 371 (c)(1),
(2), (4) Date: Feb. 2, 2009

(87) PCT Pub. No.: WO2008/016144
PCT Pub. Date: Feb. 7, 2008

(65) Prior Publication Data
US 2009/0325040 A1 Dec. 31, 2009

(30) Foreign Application Priority Data
Aug. 4, 2006 (JP) .................................. 2006-212778

(51) Int. Cl.
*H01M 2/12* (2006.01)
*H01M 2/00* (2006.01)
(52) U.S. Cl. ................ 429/53; 429/72; 429/83; 429/84; 429/86
(58) Field of Classification Search .................. None
See application file for complete search history.

(56) References Cited

U.S. PATENT DOCUMENTS

| 4,486,516 A | 12/1984 | Poe |
| 2005/0233206 A1* | 10/2005 | Puttaiah et al. ............... 429/120 |

FOREIGN PATENT DOCUMENTS

| JP | 06-176748 | 6/1994 |
| JP | 08-022815 | 1/1996 |
| JP | 2001-084981 | 3/2001 |
| JP | 2005-166318 | 6/2005 |
| JP | 2005-166319 | 6/2005 |
| WO | 2006/129340 | 12/2006 |

OTHER PUBLICATIONS

International Search Report mailed Nov. 6, 2007 for International Application No. PCT/JP2007/065281.

* cited by examiner

*Primary Examiner* — Krishnan S Menon
(74) *Attorney, Agent, or Firm* — Wenderoth, Lind & Ponack, L.L.P.

(57) ABSTRACT

A lead acid storage battery according to the present invention comprises a battery container for housing a plurality of cells, a middle lid for covering the battery container, and an upper lid for covering the middle lid, wherein, on the upper surface of the middle lid, a gas discharging port for discharging the gas generated inside of the cell and an electrolyte recirculating port for recirculating the moisture to be discharged along with the gas within the cell are formed as corresponding to each cell. A plurality of exhaust chambers separated by an exhaust chamber partition are formed in a space surrounded by the middle lid and the upper lid, and a mechanism for collectively exhausting the gas discharged from the gas discharging port to the outside of the battery by interconnecting the plurality of exhaust chambers is comprised.

12 Claims, 20 Drawing Sheets

LEAD ACID STORAGE BATTERY

TECHNICAL FIELD

The present invention relates to a lead acid storage battery comprising an exhaust structure for exhausting gas while preventing leakage of electrolyte.

BACKGROUND ART

As an exhaust structure of a mono-block type lead acid storage battery which comprises a plurality of cells, there roughly are an individual exhaust system with an exhaust plug provided in each cell and a collective exhaust system for once leading the gas exhausted from each cell into an exhaust chamber and then exhausting it into the outside. In view of the advantages, such as needing less number of parts compared with the individual exhaust system, allowing the volume in an upper space of an electrode plate to decrease, allowing the battery to be downsized without reducing its volume, and allowing the leakage amount of electrolyte to be suppressed, the collective exhaust system has been broadly employed for on-vehicle lead acid storage batteries.

Conventionally, with respect to a lead acid storage battery which employs a collective exhaust system, a type that prevents the electrolyte leakage in a form of mist or vapor into the outside of the battery and exhausts the gas so that the inner pressure of the battery does not increase has been introduced. For example, batteries have been introduced having the structures, wherein the gas including electrolyte mist and moisture vapor flows in a horizontal direction within an exhaust chamber, while in this period, the electrolyte mist and the moisture vapor are dew-condensed so as to be separated into the gas and the electrolyte, and then the gas is discharged to the outside, while the dew-condensed electrolyte is recirculated within a cell (see Patent literatures 1 and 2).

[Patent literature 1]: U.S. Pat. No. 4,486,516 A
[Patent literature 2]: Japanese Unexamined Patent Publication No. H08-22815 A Other than the above, there has been introduced a collective exhaust structure, wherein a distance for the gas flow in the horizontal direction is extended as long as possible in order to enhance the separation efficiency between the gas and the electrolyte (see Patent literature 3). In addition, an exhaust structure has been introduced, wherein a porous filter is disposed in a gas discharging port extended from an exhaust chamber to the outside of the battery so as to prevent discharging of electrolyte mist and moisture vapor, while at the same time, a space is provided in the lower side of the exhaust chamber so as to prevent clogging caused by the filter wet with electrolyte (see Patent literature 4).

[Patent literature 3]: Japanese Unexamined Patent Publication No. 2001-84981 A
[Patent literature 4]: Japanese Unexamined Patent Publication No. H06-176748 A These lead acid storage batteries of collective exhaust system are effective in view of suppressing the leakage of electrolyte since they basically dew-condense the electrolyte mist and moisture vapor leaked from each cell to recirculate them in each cell. However, when the lead acid storage battery of collective exhaust system is used, for example, in an engine room, and when comparing the cells in both ends which are easily affected by heat generated from the engine with other cells (hereinafter referred to as "intermediate cell") not easily affected by heat generation, a fall of the liquid surface occurs in the cells in both ends more easily than in the intermediate cells.

In short, when there is variation in leakage amount of electrolyte by each cell or in dew-condensed amount of electrolyte mist and moisture vapor, variation occurs also in the height of the liquid surface between cells. In a lead acid storage battery, there has been a problem that, with variation in the height of the liquid surface between cells, the life in a cell of low liquid surface height becomes shorter, thereby deteriorating the life performance as a battery.

SUMMARY OF THE INVENTION

Problem to be Solved by the Invention

It has been understood for a conventional lead acid storage battery employing a collective exhaust system, that a problem of lowering of the liquid surface in cells in both ends occurs more easily than in an intermediate cell, since the cells in both ends are easily affected by the heat generated from an engine, and thereby increasing the amount of electrolyte mist and moisture vapor leaked from these cell.

Additionally, further consideration of the cause of the above problem has revealed that, when the electrolyte mist and the moisture vapor leaked from a cell, which is easily affected by heat generation, move into the other cell through an exhaust chamber for the collective exhaust, and when a temperature of the other cell, particularly a temperature of a lid covering the cell, is low, those electrolyte mist and moisture vapor are dew-condensed in the cell of low temperature, and then recirculated therein, such that the liquid surface in a cell of low temperature reaches higher than that in a cell easily affected by heat generation. The present invention has been completed with an object of providing a lead acid storage battery which can overcome the above-mentioned problem.

Means for Solving the Problem

A lead acid storage battery according to the present invention comprises a battery container for housing a plurality of cells, a middle lid for covering the battery container, and an upper lid for covering the middle lid, wherein, on the upper surface of the middle lid, a discharging port for discharging the gas generated inside of the cell and an electrolyte recirculating port for recirculating the moisture to be discharged along with the gas within a cell are formed as corresponding to each cell, wherein at least a plurality of exhaust chambers separated by an exhaust chamber partition are formed in a space surrounded by the middle lid and the upper lid, and at the same time, a mechanism for collectively exhausting the gas discharged from the gas discharging port to the outside of the battery by interconnecting the plurality of exhaust chambers is comprised, and wherein at least one of the upper lid and the middle lid comprises at least one of a high thermal conduction member and a porous member, the high thermal conduction member having a thermal conductivity higher than that of the member composing a wall surface of the exhaust chamber, the porous member being made of porous material.

With the at least one of the upper lid and the middle lid constituted to comprise a high thermal conduction member, the temperature of the upper lid can be uniformed when the battery is used in an environment where a temperature difference between cells occurs. Therefore, even when the moisture vapor generation is not consistent due to the temperature difference between the cells, the moisture recirculating amount is also large in a cell having a large generation amount of moisture vapor, while the moisture recirculating amount can be reduced in a cell having a little generation amount of moisture vapor, and consequently, variation in liquid quantity between cells can be suppressed. With a porous member comprised, the recirculation of moisture inside of the cell can be encouraged, since the porous member is made of a porous material having a large surface area, and thus, the area for cooling the moisture in the gas generated inside of the cell is large. Therefore, the above-mentioned configuration allows the heights of the liquid surface to be uniformed among the cells, thereby improving the life performance.

And also, the present invention may be constituted as follows. A recessed portion is formed on the upper surface of the middle lid, and at least one of a part of the upper lid and the peripheral edge surrounding the recessed portion of the middle lid is provided with the high thermal conduction member. With the recessed portion formed on the upper surface of the middle lid, the leakage of dew-condensed moisture can be prevented compared with a case where the upper surface of the middle lid is flat. In addition, with a high thermal conduction member, that is made of a material of a thermal conductivity higher than that of a material of other part, provided in a part of the upper lid, the temperature of the upper lid can be uniformed, and thereby suppressing the occurrence of temperature difference between the cells in the upper lid. And also, providing a high thermal conduction member in the peripheral edge of the middle lid can suppress the leakage of electrolyte mist and the moisture vapor from the cells in both ends easily affected by the heat generation of the engine.

Exhaust chambers of the same number as the number of the cells are formed in a space surrounded by the recessed portion in the middle lid and the upper lid, while at the same time, the gas discharged from the gas discharging port is converged into a concentration exhaust chamber by providing a notched part or a through hole in an exhaust chamber partition so as to interconnect the adjacent discharging ports, and thereby collectively exhausting the converged gas out of the battery.

In this constitution, each of the adjacent exhaust chambers are interconnected via a notched part or a through hole, so that the gas discharged from each cell moves across the exhaust chambers to converge into the concentration exhaust chamber, and then is exhausted out of the battery. This constitution therefore is preferred since the simplification of the exhaust structure can be achieved.

It is preferred that at least one of the part of the upper lid and the surface of the peripheral edge of the middle lid is provided with the high thermal conduction member, so that the high thermal conduction member can be provided easily by, for example, such as being attached to the surface, and at the same time, can enhance the heat radiation from the surface.

It is preferred that at least one of the part of the upper lid and the peripheral edge of the middle lid is provided with the high thermal conduction member is embedded therein, so that the high thermal conduction member can be provided in a position close to the electrolyte recirculating port, and thus, the effect of suppressing the temperature difference of the upper lid can be enhanced.

A lead acid storage battery according to the present invention may be constituted by comprising a battery container for housing a plurality of cells, a middle lid for covering the battery container, and an upper lid for covering the middle lid, wherein, on the upper surface of the middle lid, a discharging port for discharging the gas generated inside of the cell and an electrolyte recirculating port for recirculating the moisture to be discharged along with the gas within a cell are formed as corresponding to each cell, wherein at least a plurality of exhaust chambers separated by an exhaust chamber partition are formed in a space surrounded by the middle lid and the upper lid, and at the same time, a mechanism for collectively exhausting the gas discharged from the gas discharging port to the outside of the battery by interconnecting the plurality of exhaust chambers each other is comprised, and wherein a part or the entire of the upper lid is a high thermal conduction member having a thermal conductivity higher than that of the member composing a wall surface of the exhaust chamber other than the upper lid. This constitution is preferable since a part or the entire of the upper lid is a high thermal conduction member, and thus, there is no need to provide the high thermal conduction member as an independent member, resulting in a reduced number of parts.

On the bottom surface of the upper lid, it is preferred that a protrusion is formed between the adjacent exhaust chamber partitions, so that the heat radiating from the upper lid can be enhanced, while the temperature difference of the upper lid can be suppressed.

On the upper surface of the upper lid, it is preferred that a recessed portion is formed as responding to the part where the protrusion is formed, while at the same time, the high thermal conduction member on which an engaging protrusion to engage with the recessed portion of the upper lid is formed is placed, so that the heat radiation from the upper lid can be enhanced, while at the same time, suppressing the temperature difference of the upper lid. Moreover, the above constitution is preferred since the high thermal conduction member does not directly contact with the electrolyte, with no corrosion problem occurred.

On the bottom surface of the upper lid, it is preferred that the porous member is placed in each cell, so that the moisture in the gas generated inside of a cell can be prevented from moving into other cells.

Effect of the Invention

According to the present invention, the heights of the liquid surface can be uniformed among cells, thereby improving the life performance of the battery.

DESCRIPTION OF SYMBOLS

Figure 1:
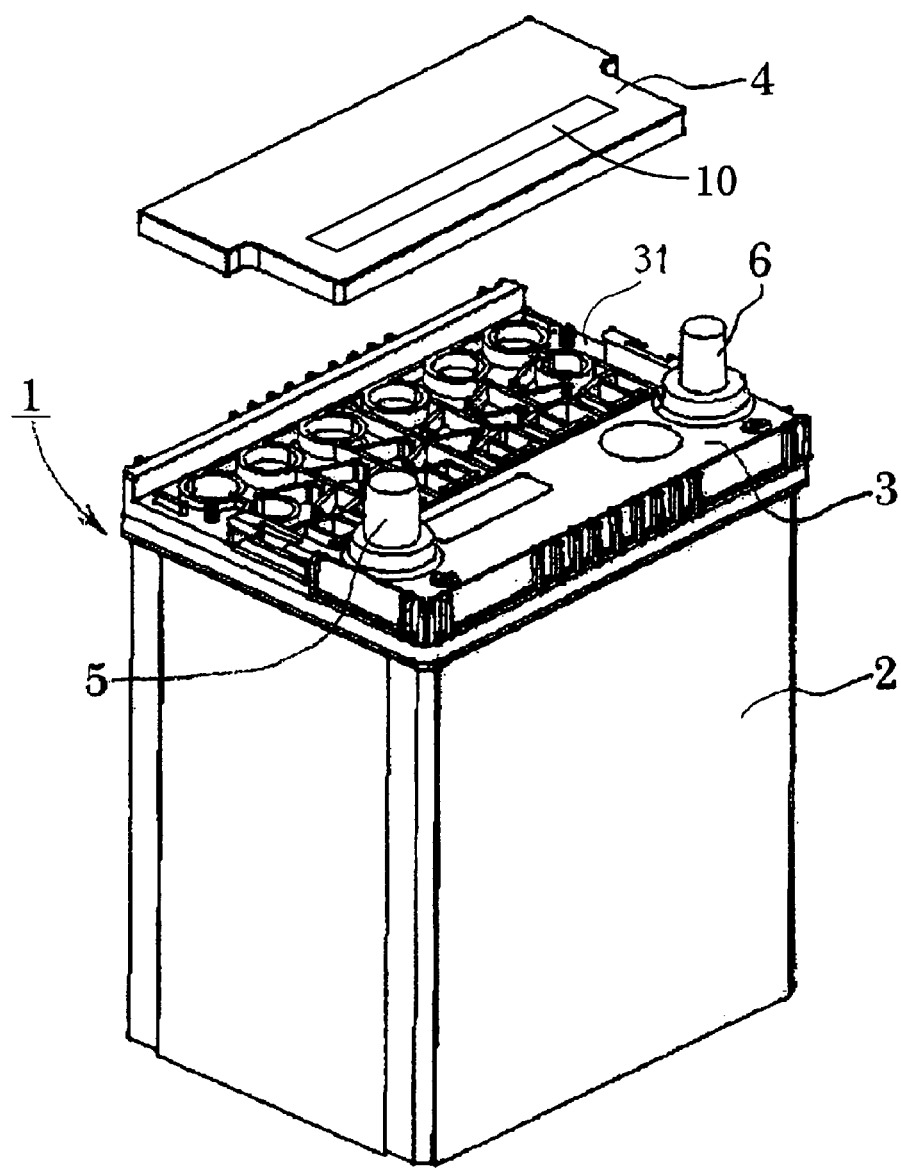
FIG. 1 is a perspective view viewed from above showing a state of a lead acid storage battery according to Embodiment 1, with an upper lid removed.

1 . . . lead acid storage battery
2 . . . battery container
3 . . . middle lid
4 . . . upper lid
10 . . . high thermal conduction member
32 . . . exhaust chamber partition
33 . . . electrolyte recirculating port
34 . . . gas discharging port
37 . . . exhaust chamber
45 . . . concentration exhaust chamber
52 . . . notched part
63 . . . porous filter
70 . . . porous member

DETAILED DESCRIPTION OF THE INVENTION

Embodiment 1

In what follows, an lead acid storage battery of Embodiment 1 according to one embodiment of the present invention is explained, however, the present invention is not limited to this. FIG. 1 is a perspective view viewed obliquely from above showing a state of a lead acid storage battery 1 of 6 cells mono-block type according to one embodiment of the present invention, with an upper lid 4 removed. Inside of a battery container 2 in the lead acid storage battery 1 is divided into 6 cells by 5 partitions (not shown) arranged in parallel on the short side, and each cell is housing an electrode plate group composed of a positive electrode plate, a negative electrode plate, and a separator, and an electrolyte composed of diluted sulfuric acid (not shown).

A middle lid 3 is attached over the battery container 2, while the upper lid 4 is attached to a recessed portion 31 in the middle lid 3. Any of the battery container 2, the middle lid 3, and the upper lid 4 are a molded body made of polypropylene resin. The battery container 1 is joined by heat-sealing with the middle lid 3 having the recessed portion 31 formed on the surface thereof, while on the recessed portion 31 in the middle lid 3, the upper lid 4 is joined by heat-sealing therewith, so that the airtight of each joint part is ensured. In addition, the shapes of the recessed portion 31 in the middle lid 3 and the inner surface (the surface of the middle lid 3 side) of the upper lid 4 are described later. In the part in the middle lid 3 not covered with the upper lid 4, there are provided a positive electrode terminal 5 made of lead alloy and a negative electrode terminal 6 made of lead alloy.

Figure 2:
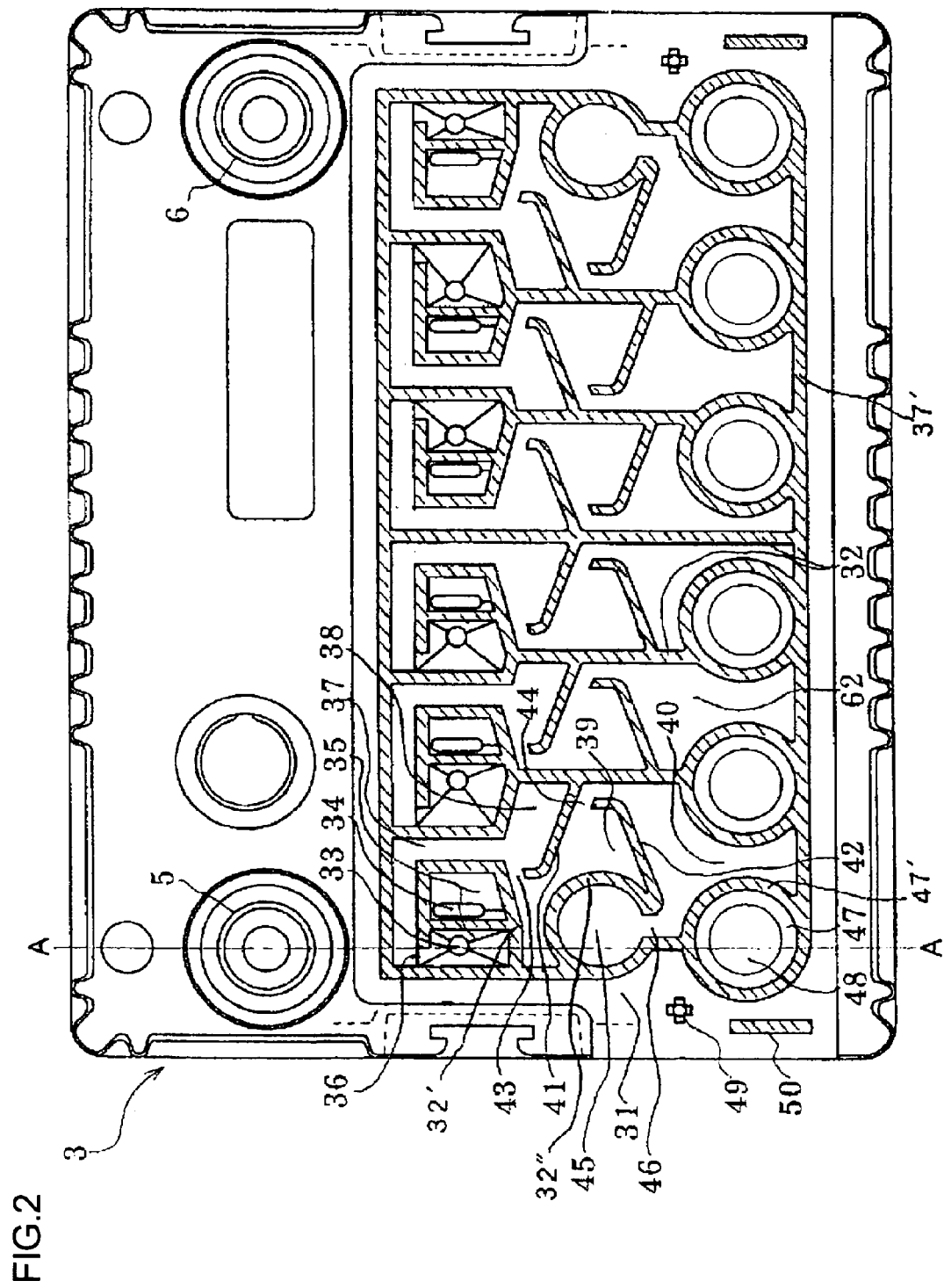
FIG. 2 is a plain view showing a middle lid of a lead acid storage battery according to Embodiment 1.
Figure 3:
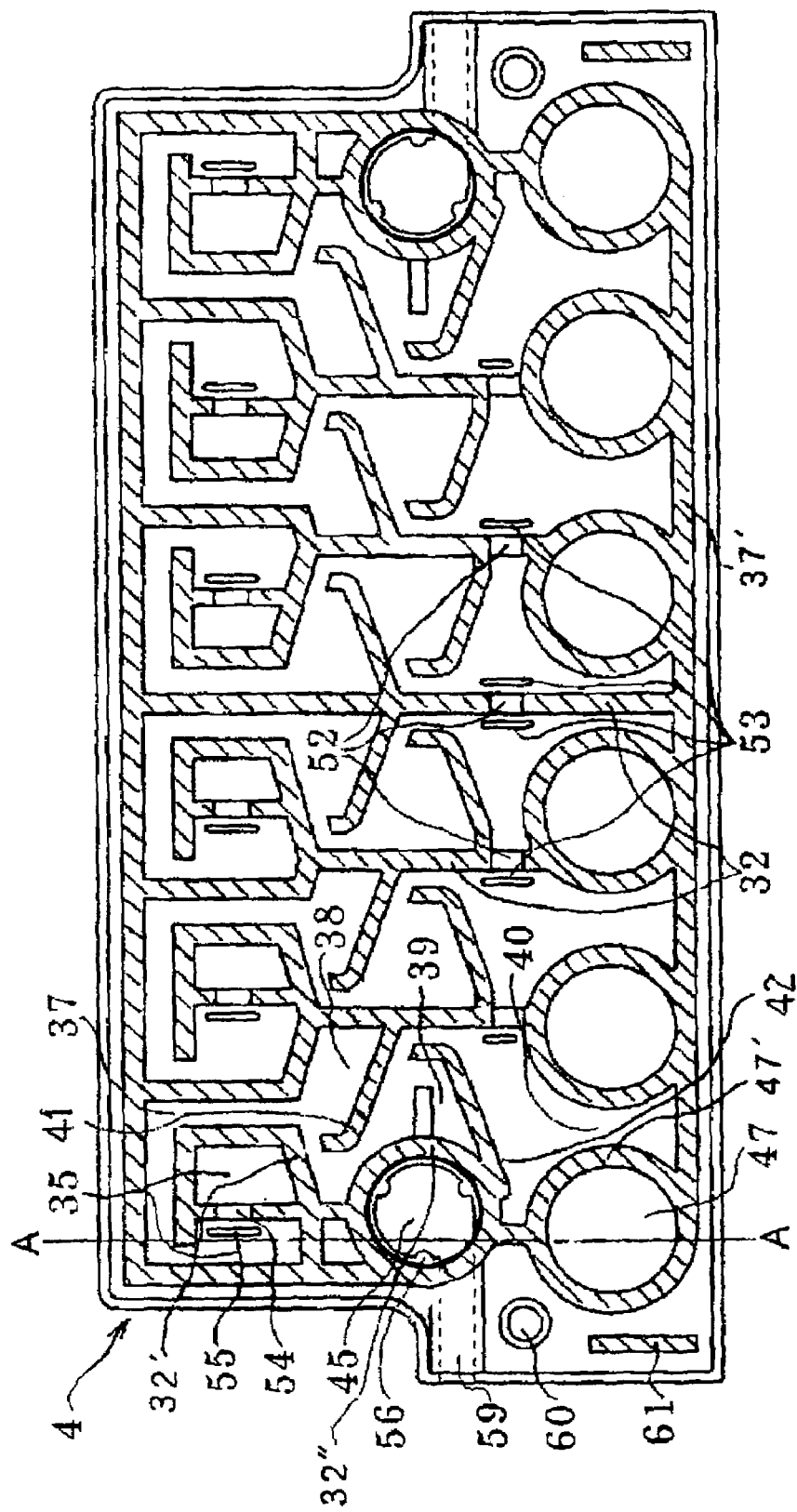
FIG. 3 is a view of a back surface of an upper lid of a lead acid storage battery according to Embodiment 1.

FIG. 2 is a plain view showing the middle lid 3, and FIG. 3 is a view of the back surface of the upper lid 4 (the upper lid 4 viewed from the bottom surface side). The upper surface of the middle lid 3 shown in FIG. 2 and the bottom surface (back surface) of the upper lid 4 shown in the FIG. 3 are arranged in positions such that, when the upper lid 4 is mounted on the recessed portion 31 in the middle lid 3, each of a partition 37' as well as each of an exhaust chamber partition 32 shown with diagonal lines in FIGS. 2 and 3 respectively overlap, and the upper end of the partition 37' in the middle lid 3 is joined with the lower end of the partition 37' in the upper lid 4, and the upper end of the exhaust chamber partition 32 in the middle lid 3 is joined with the lower end of the exhaust chamber partition 32 in the upper lid 4, respectively by heat-sealing. Additionally, the exhaust chamber partition 32 is provided in a position responding respectively to partition (not shown) inside of the battery container 2 which is dividing the inside of the battery into 6 cells.

Figure 4:
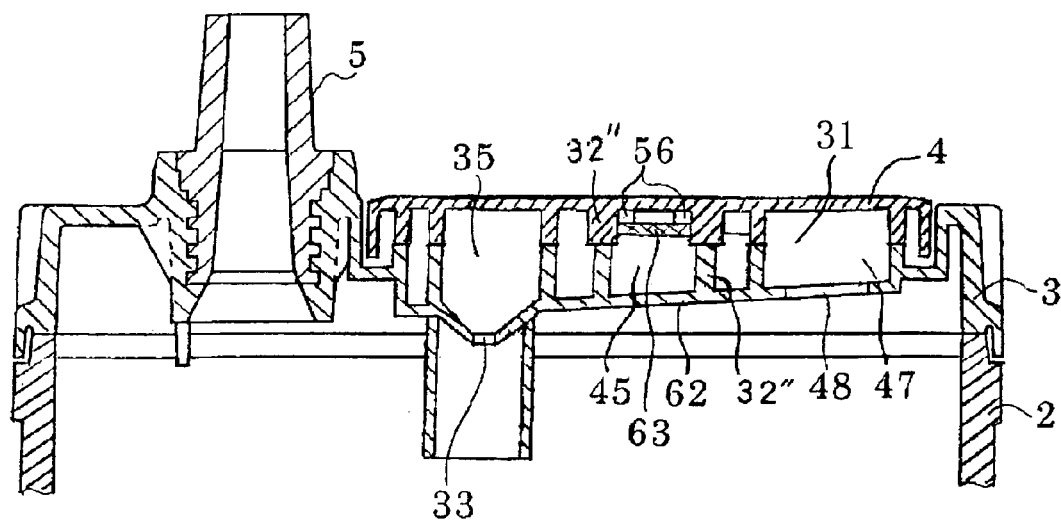
FIG. 4 is a cross-sectional view taken along a line A-A in FIGS. 2 and 3 showing a state where an upper lid is mounted to a recessed portion of a middle lid.

And also, as shown in FIG. 2, a liquid injection chamber 47 comprising an opening 48 in each cell is divided by the partition 47' in its circumference from an exhaust chamber 37 (exhaust small chamber 40). The concentration exhaust chamber 45 is divided by a partition 32" from the exhaust chamber 37 (exhaust small chamber 39), and interconnected with the exhaust chamber 37 (exhaust small chamber 40) only though a notched part 46 in the partition 32". In the upper lid 4 side, there are also provided partitions 47' and 32" as responding to these partitions 47' and 32", and they are arranged in positions respectively overlapping as mentioned above. In addition, as shown in FIG. 4 (a cross-sectional view taken along a line A-A in FIGS. 2 and 3 showing a state, where the upper lid 4 is mounted on the recessed portion 31 in the middle lid 3, so that the partition 37' provided in the recessed portion 31 in the middle lid 3 and the partition 37' provided on the inner surface of the upper lid 4 are joined), the thickness of the partition 32" in the upper lid 4 is preferred to be larger than that of the partition 32" in the middle lid. The ratio of the thickness between both the partitions are not particularly limited, however, the thickness of the partition 32" in the upper lid 4 is preferred to be from 1.5 to 3 times the one of the partition 32" in the middle lid 3.

In addition, as shown in FIG. 2, a cell-interconnecting small chamber 35 has a gas discharging port 34 for discharging the gas generated in the cell and an electrolyte recirculating port 33 for recirculating the water dew-condensed in the exhaust chamber 37 or the electrolyte within the cell. The gas discharged from the gas discharging port 34 is then led into the exhaust chamber 37 through a notched part 54 formed on the inner surface of the upper lid 4 shown in FIG. 3 and a notched part 36 formed on the upper surface of the middle lid 3 shown in FIG. 2. The water or the electrolyte generated due to dew-condensation within the exhaust chamber 37 are brought from the exhaust chamber 37 back into the cell from the electrolyte recirculating port 33 through the notched part 36, while the not dew-condensed gas is led into the concentration exhaust chamber 45 from the exhaust chamber 37.

The exhaust chamber 37 is divided into three exhaust small chambers 38, 39 and 40 by two partition plates 41 and 42, and the adjacent exhaust small chambers are interconnected each other through notched parts 43 and 44 provided one by one respectively in the partition plates 41 and 42. In the side of the upper lid 4, there are also provided the partition 32' and the partition plates 41 and 42 as responding to the partition 32' and the partition plates 41 and 42 in the cell-interconnecting small chamber 35, and, as mentioned, they are arranged in positions respectively overlapping.

Additionally, the floor surface of the exhaust chamber 37 is tilted along the short side of the middle lid 3, such that the closer to the cell-interconnecting small chamber 35 the lower, while at the same time, the longer the distance from the cell-interconnecting small chamber 35 the higher (it can be seen from FIG. 4 that the floor wall 62 of the recessed portion 31 in the middle lid 3 is tilted such that the closer to the cell-interconnecting small chamber 35 the lower, while at the same time, the farther from the cell-interconnecting small chamber 35, the higher).

Additionally, as can be seen from FIG. 2, the partition plates 41 and 42 are also slant against the tilt of the floor wall 62, and in addition, the notched parts 43 and 44 in the partition plates 41 and 42 are arranged in the lowest positions in the above mentioned tilted floor surface, so that the electrolyte dew-condensed within the exhaust chamber 37 easily moves along the tilt of the floor wall 62 of the exhaust chamber 37 to the side of the electrolyte recirculating port 33 in a normal state of the battery (in a state the battery is positioned flatly).

In addition, the notched parts 43 and 44 provided in the partition plates 41 and 42 are arranged so as not to overlap on the line parallel to the tilt of the floor wall 62 of the exhaust chamber 37 (arranged in zig-zag positions in the figure), such that the passage for the gas passing through the exhaust chamber 37 is extended, and the electrolyte mist and the moisture vapor, which get mixed into the gas during its passage through the exhaust chamber 37, are efficiently dew-condensed, thereby recirculating within the cells.

Moreover, the notched part 46 provided in the partition 32" in the concentration exhaust chamber 45 is interconnected with the exhaust small chamber 40 which is positioned most away from the cell-interconnecting small chamber 35 among the three exhaust small chambers 38, 39, and 40, so that as much moisture as possible can be removed from the gas led into the concentration exhaust chamber 45.

Next, the structure of collective exhaust is described. The interconnection between the concentration exhaust chamber 45 and the exhaust chambers 37 corresponding to the cells in both ends is as described above, however, the exhaust chamber 37 for an intermediate cell and the concentration exhaust chamber 45 are interconnected through the notched part 52 provided in the exhaust chamber partition 32 on the inner surface of the upper lid 4, so that the gas discharged from each cell moves across the exhaust chamber 37 corresponding to other cell and is led into the concentration exhaust chamber 45.

However, in order not to generate the difference in electrolyte amounts between cells, even when the gas moves across the exhaust chamber 37 corresponding to other cell, the water generated due to the dew-concentration within the exhaust chamber 37 corresponding to each cell needs to recirculate within the corresponding cell without moving across. It is therefore preferred that a baffle plate 53 is disposed in the concentration exhaust chamber 45's side in the exhaust chamber partition 32. Similarly, the baffle plate 55 is also preferred to be disposed in the side of the electrolyte recirculating port 33 for the notched part 54 that interconnects the gas discharging port 34 in the cell-interconnecting small chamber 35 and the electrolyte recirculating port 33.

The electrolyte mist and moisture vapor mixed in the gas discharged from the cell is dew-condensed in a process of passing through the exhaust chamber 37, and is mostly eliminated before reaching to the concentration exhaust chamber 45, however, there is sometimes a case a slight amount of water and electrolyte are still included. For encouraging such a slight amount of water and electrolyte to recirculate in each cell, as shown in FIG. 4, a porous filter 63 composed of a porous material made of polypropylene or ceramic is preferred to be engaged inside of the partition 32" in the upper lid 44 surrounding the concentration exhaust chamber 45, so that the gas can pass through the porous filter 63 in the thickness direction. It is therefore preferred that a protrusion 56 is provided on inner surface of the upper lid 4 so that a space can be formed between the porous filter 63 and the inner wall surface of the upper lid 4. This allows the gas moved into the concentration exhaust chamber 45 in the middle lid 3 side to move up from down within the porous filter 63 in the thickness direction to reach to the space, thereby being discharged to the outside through a discharging path 59 formed on the inner surface of the upper lid 4.

In addition, the shape and the number of the protrusion 56 is not particularly limited, however, in order to parallelize the spacing between the porous filter 63 and the inner wall surface of the upper lid 4, it is preferred that the protrusion 56 may be provided as a circular step in the inner circumference of the concentration exhaust chamber 45 or at least three of them may be arranged at regular intervals. And also, a tilt is preferred to be provided on the floor surface of the concentration exhaust chamber 45, such that the closer to the notched part 46 provided in the partition plate 42 for interconnecting the concentration exhaust chamber 45 and the exhaust small chamber 40 the lower, while at the same time, the farther from the notched part 46 the higher.

It is also preferred that the discharging path 59 for discharging the gas to the outside of the battery is provided in a position close to the notched part 46. In a state with the pressure inside of the exhaust chamber 37 increased by the gas discharged from the cell, when the gas moves from the exhaust chamber 37 to the concentration exhaust chamber 45 by the gas pressure inside of the exhaust chamber 37, the gas flow is likely to concentrate into the back part away from the entrance (the notched part 46) of the concentration exhaust chamber 45. Therefore, when a slight amount of electrolyte mist and moisture vapor are mixed into the gas without being dew-condensed in the exhaust chamber 37, its flow is also likely to concentrate into the back part of the concentration exhaust chamber 45, resulting in the clogging of the porous filter 63 due to the dew-condensation of the electrolyte in this part. The above configuration of the tilt of the floor surface of the concentration exhaust chamber 45 as well as the arrangement of the gas discharging path 59 extending from the concentration exhaust chamber 45 to the outside of the battery allows the gas to uniformly pass through the porous filter 63.

In the above-mentioned configuration, with the recessed portion 31 in the middle lid 3 covered with the upper lid 4, the cell-interconnecting small chamber 35 and the exhaust chamber 37, the adjacent exhaust small chambers 40 each other, and the exhaust chamber 37 and the concentration exhaust chamber 45 can be respectively interconnected only through the notched part provided in each the partition. In addition, the notched parts 36, 43, and 44 are preferred to be provided in the middle lid 3 side when circulating the water or the electrolyte, while the notched parts 52 and 54 are preferred to be provided in the upper lid 4 side when circulating the gas. Also, the partition surrounding the liquid injection chamber 47 is constituted by having no notched part, so that, when the partition of the upper lid 4 and the partition of the middle lid 3 are joined each other, the liquid injection chamber 47, exhaust chamber 37, or the outside of the battery can be isolated in an airtight manner.

Also, in FIGS. 2 and 3, the numeral "49" indicates a positioning pin, that is used when the upper lid 4 is mounted in the recessed portion 31 in the middle lid 3, and is engaged with a cylindrical hole 60 provided in the upper lid 4. The numerals "50" in the middle lid 3, "61" in the upper lid 4 respectively indicate a joint protrusion for bringing the joint tight between the middle lid 3 and the upper lid 4.

In the lead acid storage battery according to the present embodiment, as shown in FIGS. 1 and 5A to 5D, at least one of a part of the upper lid 4 and the peripheral edge of the middle lid 3, with the recessed portion 31 formed therein, provided with a high thermal conduction member 10 having a thermal conductivity higher than that of the member constituting the wall surface of the exhaust chamber. According to the present invention, the member constituting the wall surface of the exhaust chamber 37 indicates the wall constituting the floor surface, the ceiling surface, and the side surface. Since polypropylene is used as the material for the upper lid 4 and the middle lid 3, a material having a thermal conductivity higher than that of polypropylene is preferred for the high thermal conduction member 10. In particular, stainless steel, silver, copper, gold and aluminum may be used, however, in view of cost and weight, stainless steel or aluminum may be preferred.

The action effect of the present embodiment is explained. When the battery according to the present embodiment is used in an environment where a temperature difference occurs, the temperature of the upper lid 4 can be uniformed since at least one the upper lid 4 and the peripheral edge of the middle lid 3 is provided with the high thermal conduction member 10. Therefore, even when the generation amount of moisture vapor is not constant due to the temperature difference in every cell, the variation of liquid amounts between cells can be consequently suppressed, since the moisture recirculating amount is large in the cell of large generation amount of moisture vapor, while the moisture recirculating amount can be reduced in the cell of low generation amount of moisture vapor. Also, with the recessed portion 31 formed on the upper surface of the middle lid 3, the loss of dew-condensed moisture can be prevented. Also, each adjacent exhaust chamber 37 is constituted by being interconnected through the notched part 52 in the exhaust chamber partition 32, so that the gas is concentrated into the concentration exhaust chamber 45 and then collectively exhausted out of the battery 1, thereby achieving the simplification of exhaust structure.

Next, concrete examples (Examples 1 to 5) having a high thermal conduction member 10 provided are explained.

Example 1

Figure 5A:
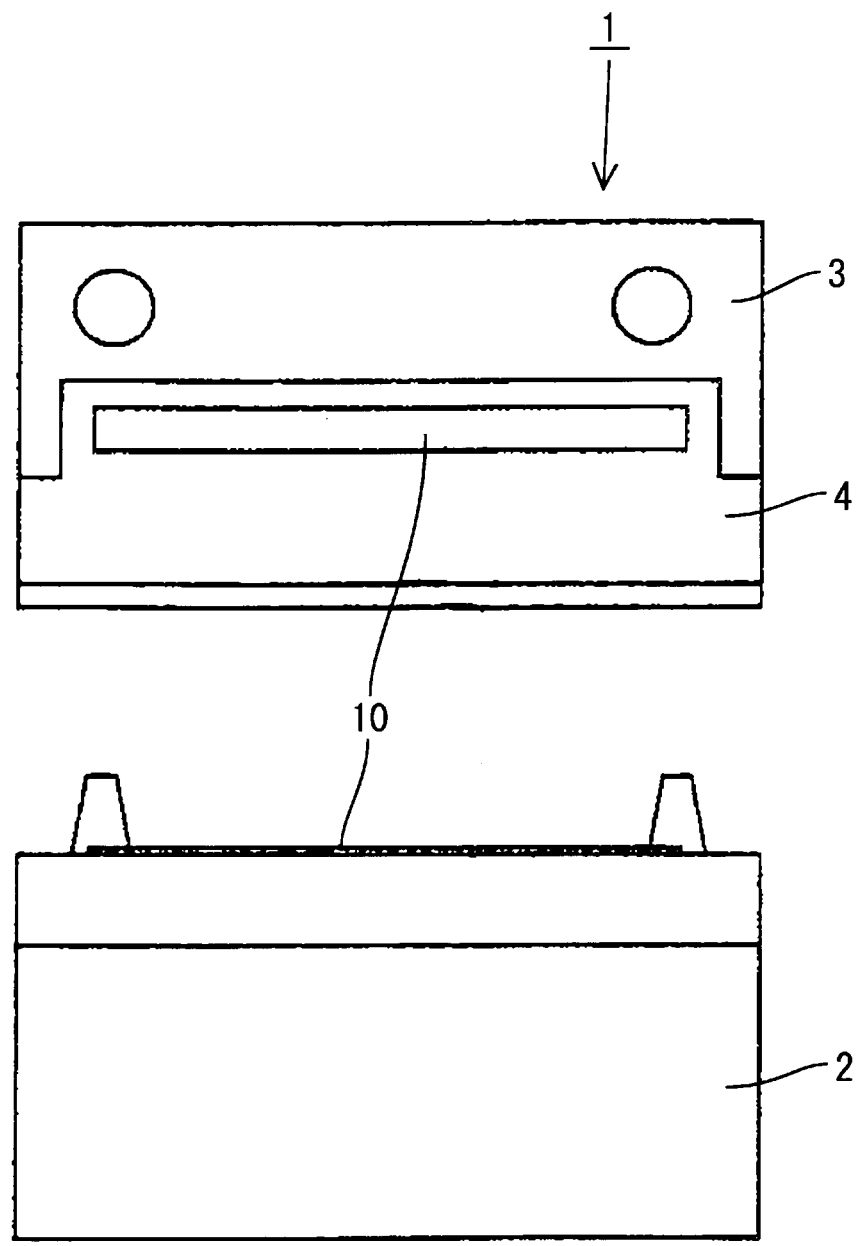
FIG. 5A shows an upper figure illustrating a plain view of a lead acid storage battery according to Example 1 and a lower figure illustrating an elevation view thereof.

As shown in FIGS. 1 and 5A, a high thermal conduction member 10 is placed on the upper surface of the upper lid 4. The placing position is not particularly limited, however, the high thermal conduction member 10 is preferred to be provided in the above of the cell-interconnecting small chamber 35. This allows the electrolyte mist and moisture vapor included in the gas discharged from the gas discharging port 34 to be dew-condensed in an early stage and to recirculate within the cell from the electrolyte recirculating port 33, and thus, the electrolyte mist and moisture vapor in the gas in a process of moving from the exhaust chamber 37 to the concentration exhaust chamber 45 can be reduced, thereby contributing to prevent the clogging of the porous filter 63.

Additionally, the high thermal conduction member 10 is provided in apart of the upper lid 4, with intention to obtain the most effective position on the upper surface in view of cost and weight, and thus, the entire surface of the upper surface is not necessarily excluded here.

According to the present example, the high thermal conduction member can be easily placed by a method such as, for example, attaching to the surface, and further, the heat radiation of the upper lid from the upper surface can be encouraged.

Example 2

Figure 5B:
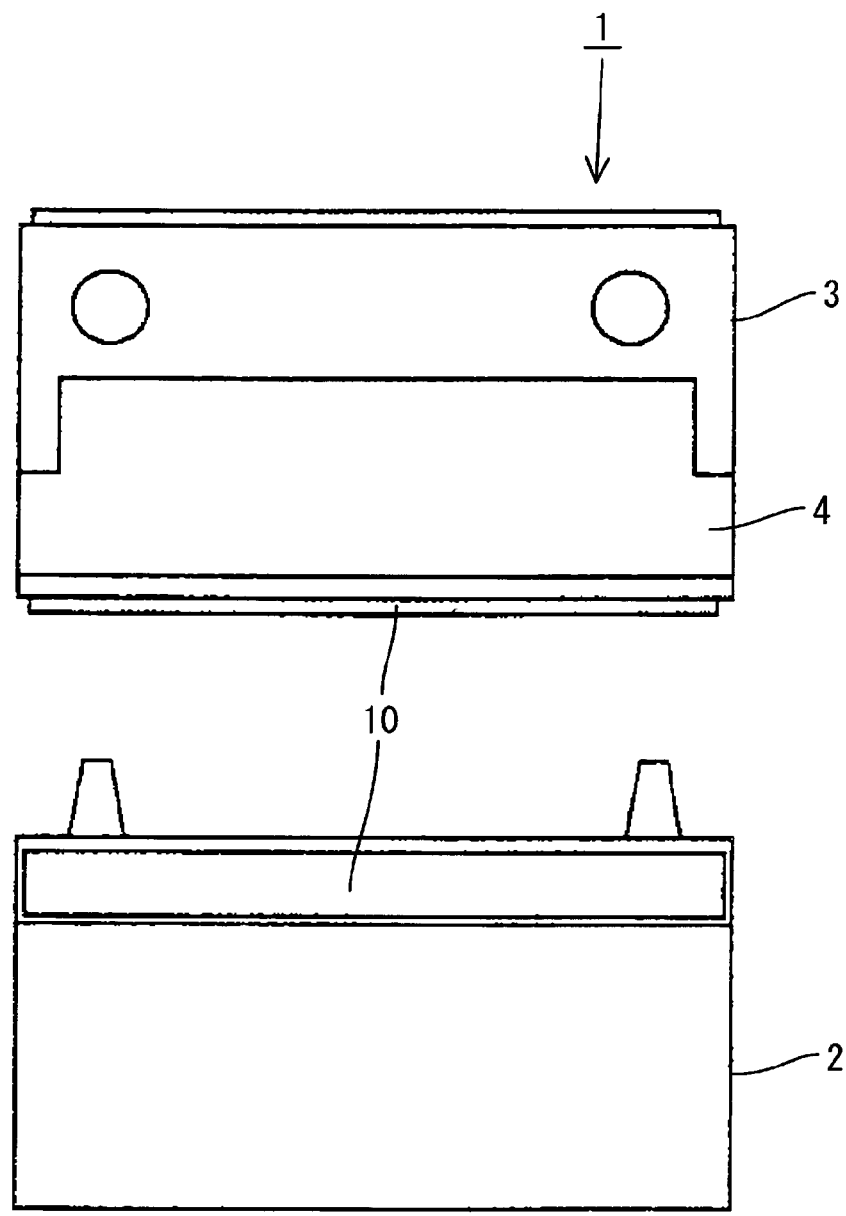
FIG. 5B shows an upper figure illustrating a plain view of a lead acid storage battery according to Example 2 and a lower figure illustrating an elevation view thereof.

FIG. 5B shows the high thermal conduction member 10 placed in the peripheral edge (the longer side of the battery) of the middle lid 3 having the recessed portion 31 formed therein. In this case, the placing position is also not particularly limited, however, as can be clearly seen from FIG. 1, the high thermal conduction member 10 is placed in the long side only because it is constitutionally difficult to place in the short side of the battery. When it is constitutionally possible, the high thermal conduction member 10 may be placed in both sides, or only in the short side. The present example allows the heat transmission from the outside of the battery to the recessed portion to be suppressed, thereby uniforming the temperature of the recessed portion corresponding to each cell. Consequently, a problem that the gas leaked out of a cell is dew-condensed in another cell and recirculates in the cell can be prevented from occurring.

Example 3

Figure 5C:
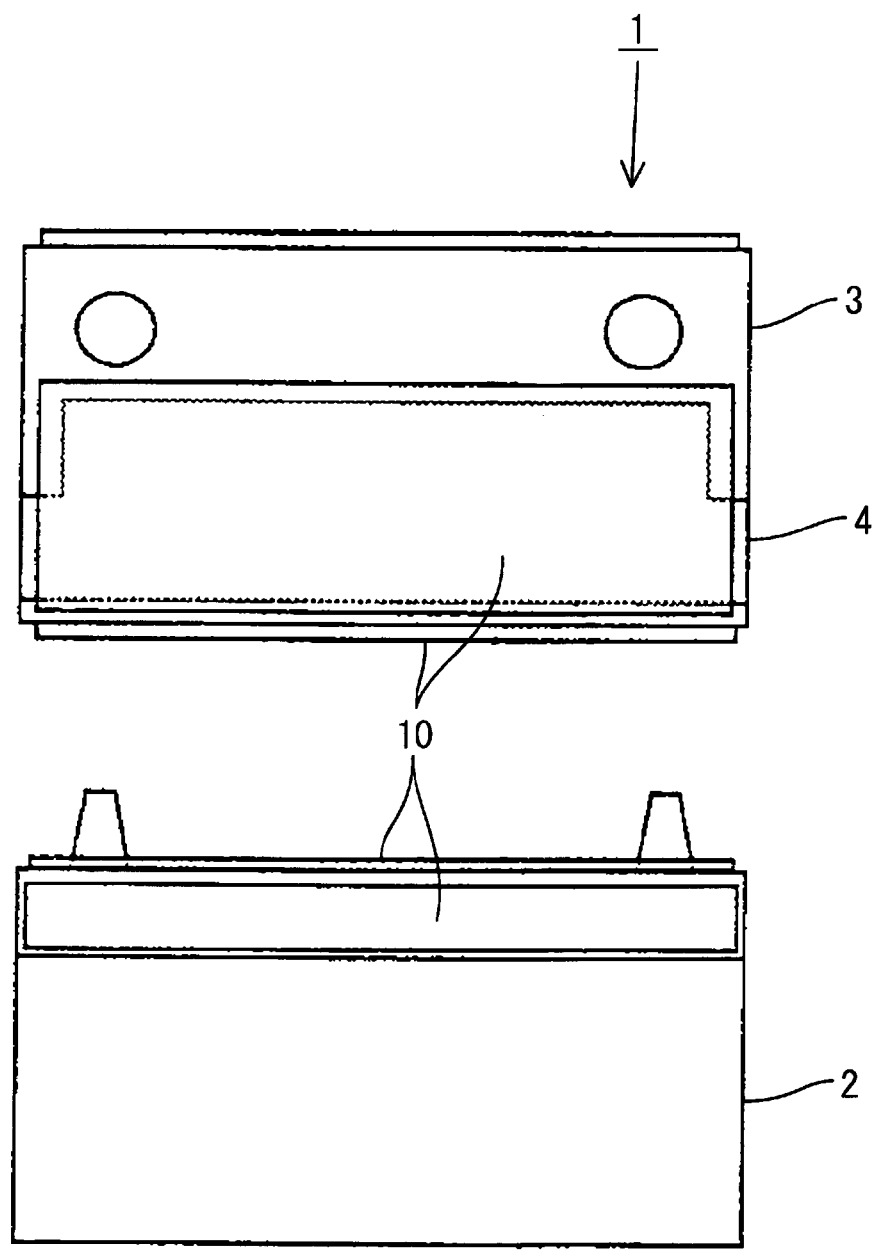
FIG. 5C shows an upper figure illustrating a plain view of a lead acid storage battery according to Example 3 and a lower figure illustrating an elevation view thereof.

As shown in FIG. 5C, a high thermal conduction member 10 is placed on the upper surface of the upper lid 4 and in the peripheral edge (the long side of the battery) of the middle lid 3. The present example allows the action effect of the lead acid storage battery in Examples 1 and 2 to be delivered.

Example 4

Figure 5D:
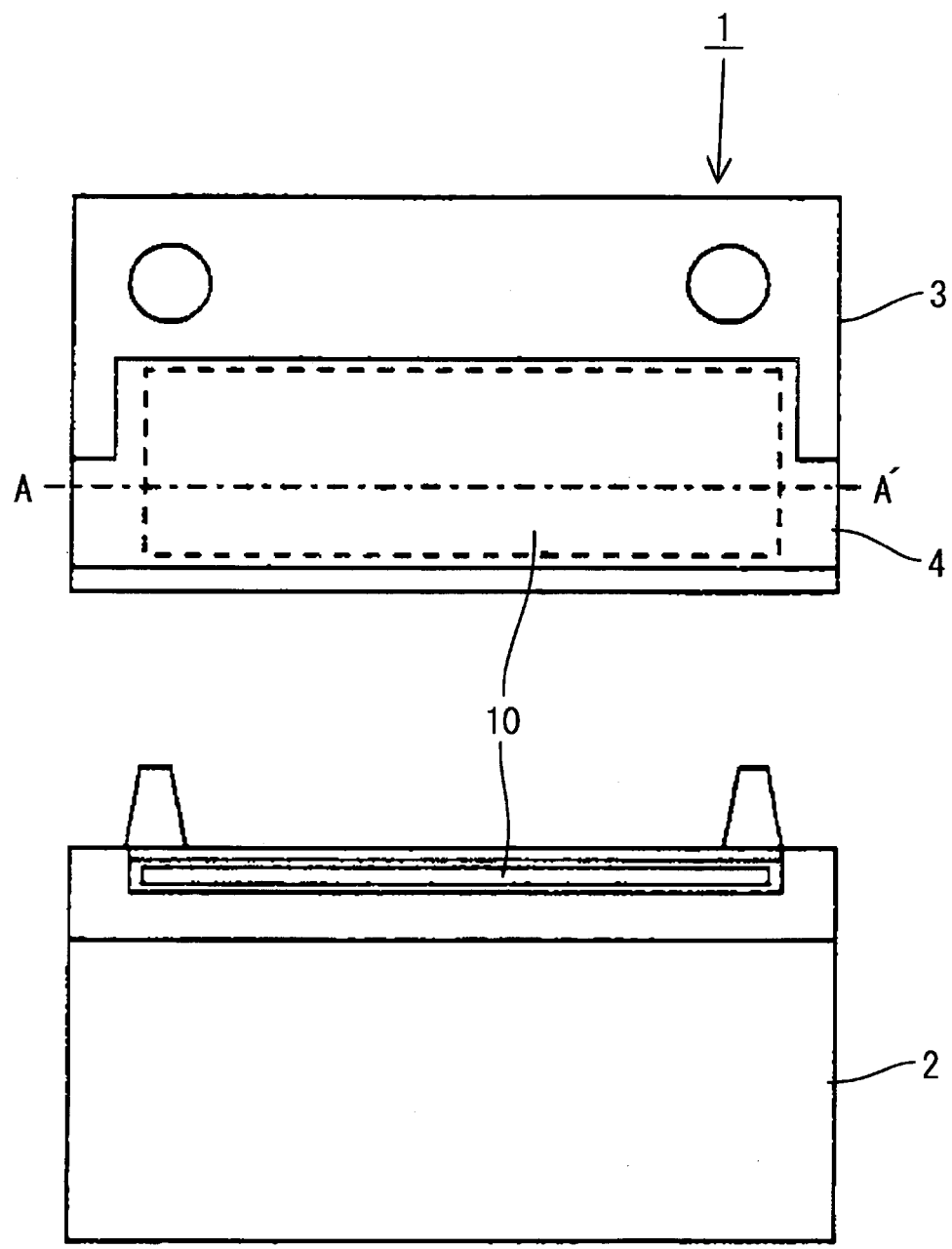
FIG. 5D shows an upper figure illustrating a plain view of a lead acid storage battery according to Example 4 and a lower figure illustrating an elevation view thereof.

As shown in FIG. 5D, the high thermal conduction member 10 is embedded in the upper lid 4. In particular, the upper lid 4 may be double layered so as to have the high thermal conduction member 10 sandwiched between two layers, or the high thermal conduction member 10 may be placed in the inner surface of the upper lid 4. In the latter case, "embedded" may not be an exact word, however, when the battery 1 with the upper lid 4 attached is viewed from the outside, the high thermal conduction member 10 is not visible, and thus the present invention includes this configuration as a "embedded" state.

As a method for embedding the high thermal conduction member 10, there are methods, such as embedding the high thermal conduction member 10 in the upper lid 4 by means of injection molding, or preliminarily sandwiching the high thermal conduction member 10 between the parts in the upper lid 4 having an up-and-down two division structure and then integrating the parts in the upper lid 4 in two division structure by heat-sealing or by an adhesive. Additionally, the high thermal conduction member 10 is not necessarily and completely hermetically-sealed against the external air.

According to the present example, the high thermal conduction member 10 is embedded in a part of the upper lid 4, so that the high thermal conduction member 10 can be provided in a position closer to the electrolyte flowing back port, and thus, the effect of suppressing the temperature difference of the upper lid can be enhanced. In this Example 4, the high thermal conduction member 10 is embedded in the upper lid 4, however, similar to the Example 2, it may be embedded in the peripheral edge of the middle lid 3, or, similar to the Example 3, it may be embedded in both the upper lid 4 and in the peripheral edge of the middle lids 3.

Example 5

In Examples 1 to 4, at least one of the part of the upper lid 4 and the peripheral edge of the middle lid 3 with the recessed portion 31 formed therein is provided with the high thermal conduction member 10 as an independent member, which is made of a material of thermal conductivity higher than that of the member constituting the wall surface of the exhaust chamber 37. In the present example, the entire upper lid 4 is the high thermal conduction member 10 having a thermal conductivity higher than that of the part other than the upper lid.

For example, to mix a filler having alumina as a main composition into the resin for molding the upper lid 4 allows the upper lid 4 to be the high thermal conduction member 10. With such a filler mixed at an amount of 15±5 vol. % with the resin, in a case of, for example, the later described B24 battery, the thermal conductivity of the upper lid can be doubled.

The above mixing amount '15±5 vol. %' of the filler is decided in view of that, when the filler amount is greater, the improvement of thermal conductivity becomes larger, however, the moldability is deteriorated; when the filler amount is less, the moldability becomes favorable, however, the thermal conductivity cannot be improved. The present example is preferred since there is no need to provide the high thermal conduction member 10 as an independent member, resulting in a reduced number of parts.

Embodiment 2

The lead acid storage battery 1 according to Embodiment 2 is explained in reference to FIGS. 6 to 10. In the following description, repetitive descriptions about structure, action, and effect same as those in Embodiment 1 are omitted.

Figure 7:
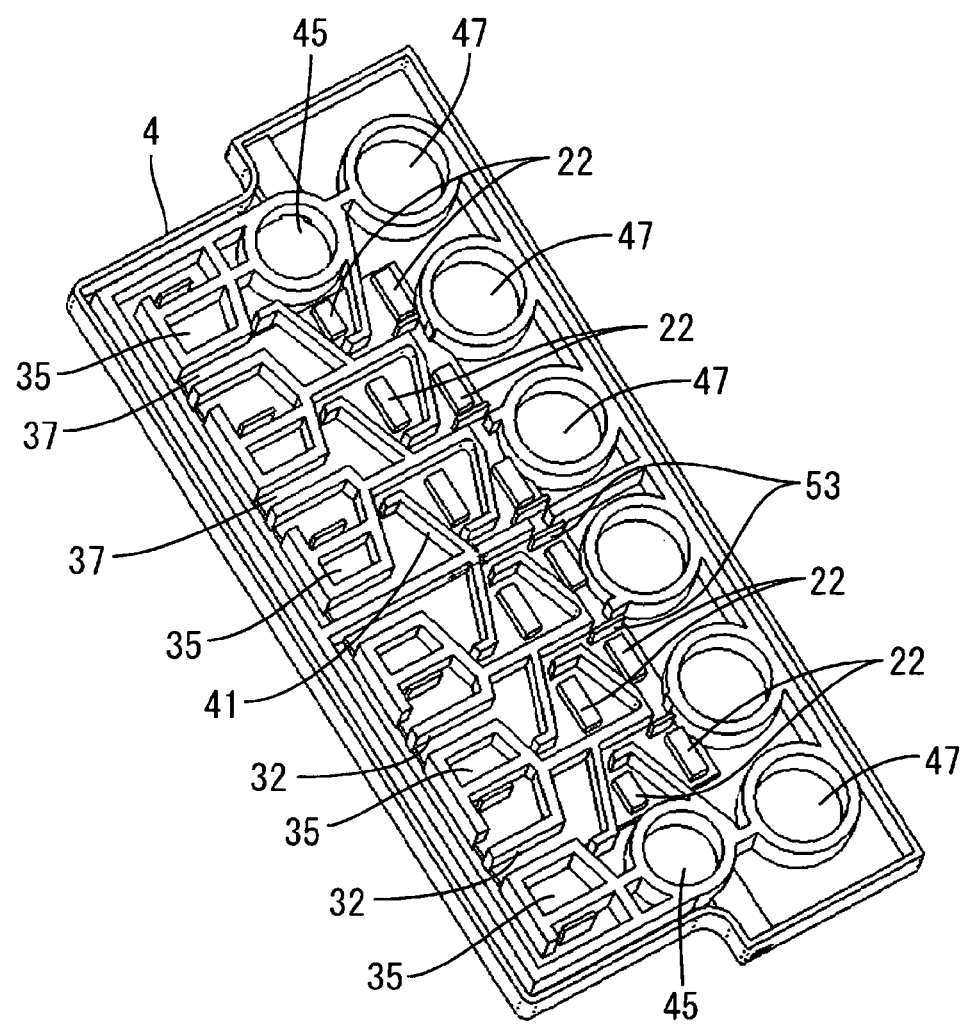
FIG. 7 is a perspective view showing an upper lid of a lead acid storage battery according to Embodiment 2 viewed from its bottom surface.
Figure 8:
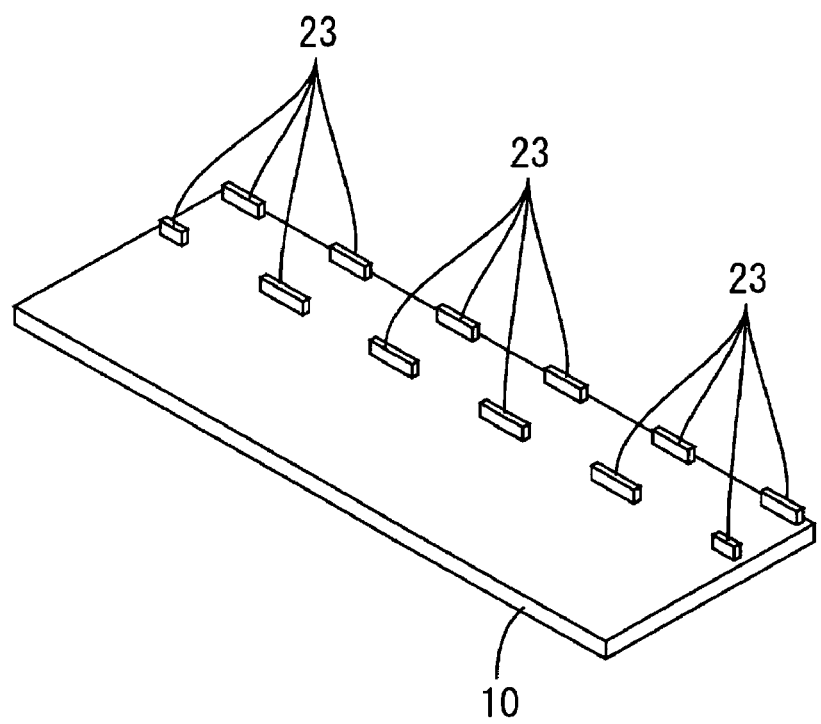
FIG. 8 is a perspective view showing a high thermal conduction member to be engaged with an upper lid of a lead acid storage battery according to Embodiment 2, viewed from its bottom surface.
Figure 9:
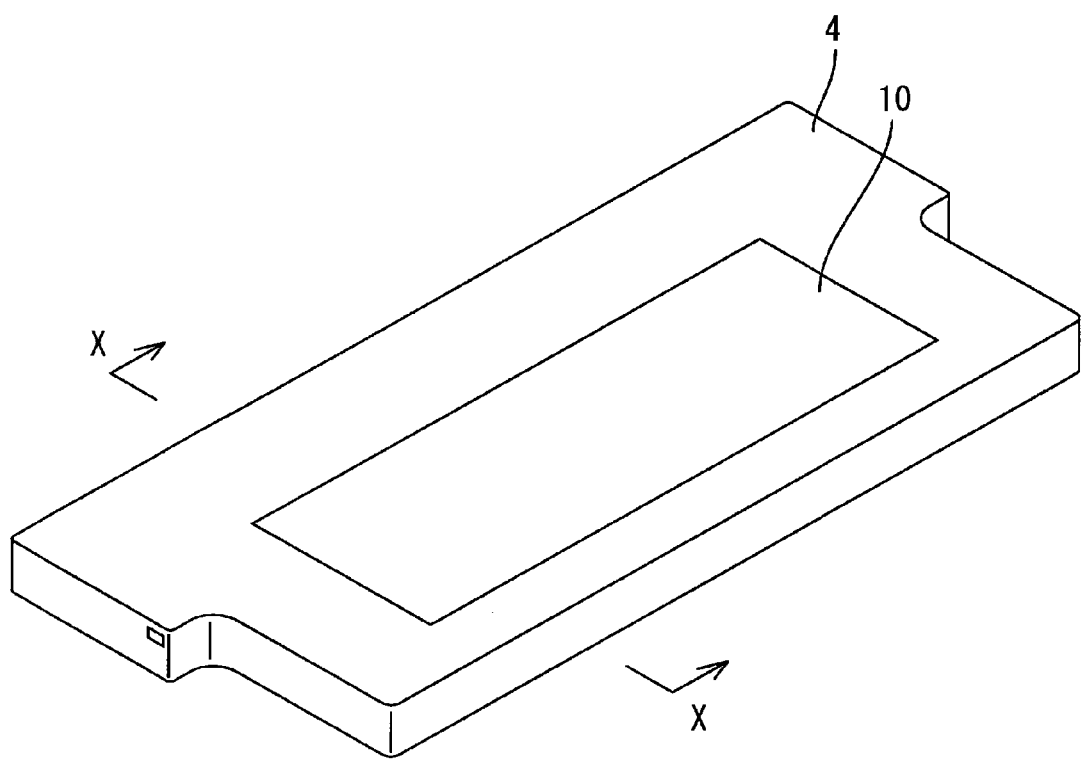
FIG. 9 is a perspective view showing an upper lid, with a high thermal conduction member engaged in a lead acid storage battery according to Embodiment 2, viewed from its upper surface.

In the lead acid storage battery 1 of the present embodiment, as a difference from Embodiment 1, the high thermal conduction member 10 is provided as a part of the upper lid 4 as shown in FIG. 9, and at the same time, a protrusion 22 is formed in a projecting manner on the bottom surface of the upper lid 4 as shown in FIG. 7. In the bottom surface (back surface) of the high thermal conduction member 10 placed in a part of the upper lid 4, as shown in FIG. 8, engaging protrusions 23 aligned by six in each of two columns aligned in parallel in a longitudinal direction.

Figure 6:
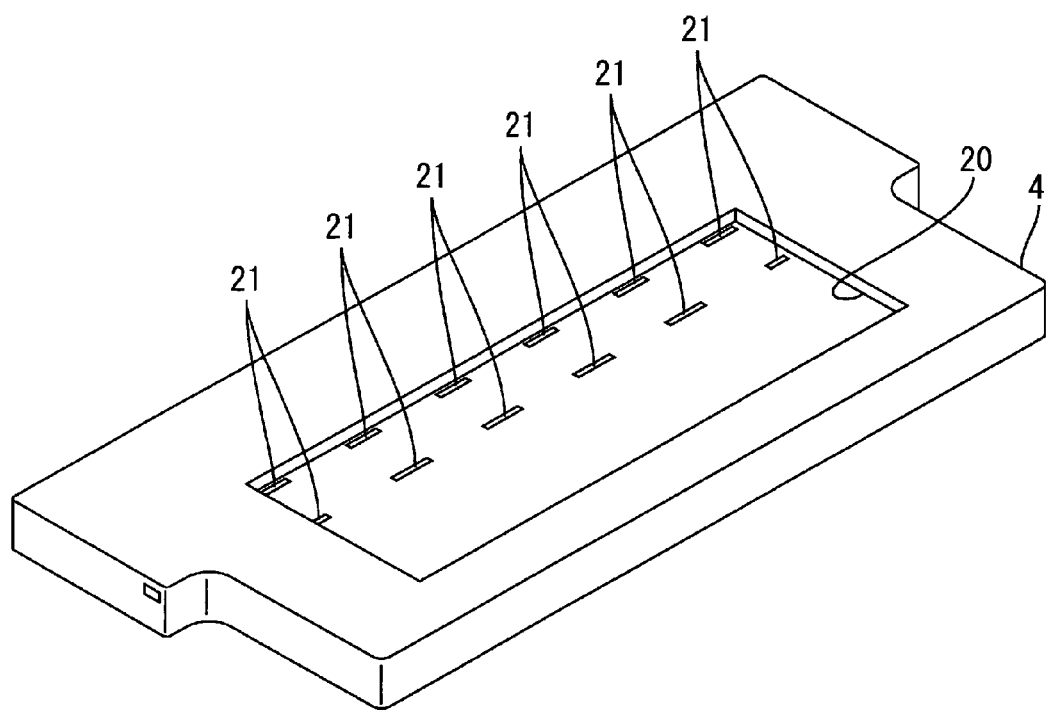
FIG. 6 is a perspective view showing an upper lid of a lead acid storage battery according to Embodiment 2 viewed from its upper surface.

As shown in FIG. 6, the high thermal conduction member 10 is placed in a part (hereinafter referred to as "placing part 20") in the upper lid 4 that is scooped out in conformity to the shape of the high thermal conduction member 10. In this placing part 20 formed in the upper lid 4, 12 recessed portions 21 are formed and aligned by 6 in each of two columns, so as to engage with the engaging protrusions 23 in the high thermal conduction member 10.

Figure 10:
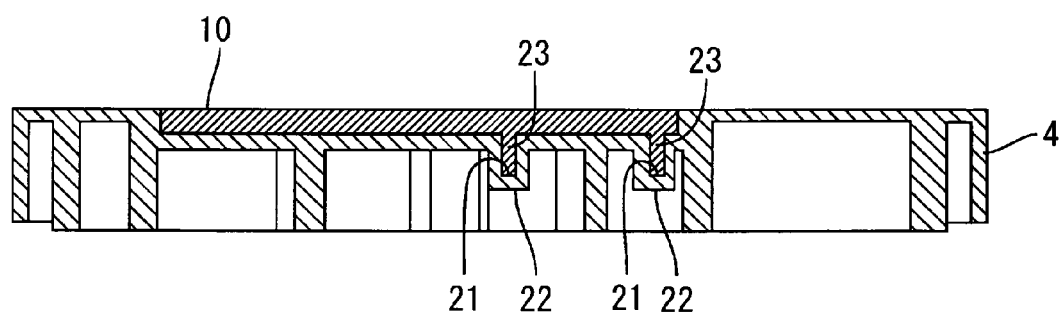
FIG. 10 is a cross-sectional view taken along a line X-X in FIG. 9.

As shown in FIG. 10, in a state where the high thermal conduction member 10 is engaging with the upper lid 4, the engaging protrusions 23 in the high thermal conduction member 10 are engaging with the recessed portions 21 formed in the upper lid 4, so that the high thermal conduction member 10 does not contact with the electrolyte discharged out of the cell.

Next, the action effect of the present embodiment is explained. When the recessed portion 21 formed in the placing part 20 in the upper lid 4 is viewed from the bottom surface (back surface) of the upper lid 4 (see FIG. 7), the recessed portion 21 is protruded between the adjacent exhaust chamber partitions 32 so as to function as a protrusion 22 for dissipating heat of the upper lid 4. In short, the recessed portion 21 formed on the upper surface of the upper lid 4 functions as the protrusion 22 which protrudes toward the bottom surface side so as to dissipate heat of the upper lid 4, and, in addition, as the engaging recessed portion 21 for engaging with the engaging protrusion 23 in the high thermal conduction member 10. According to the present embodiment, with the protrusion 22 provided for dissipating heat of the upper lid 4, the heat dissipation from the upper lid 4 is encouraged, and at the same time, the engaging protrusion 23 in the high thermal conduction member 10 is fitted in the recessed portion 21 in the upper lid 4 so as not to contact with the electrolyte discharged out of the cell, and thereby preventing corrosion caused by the contact with electrolyte.

Embodiment 3

Figure 11:
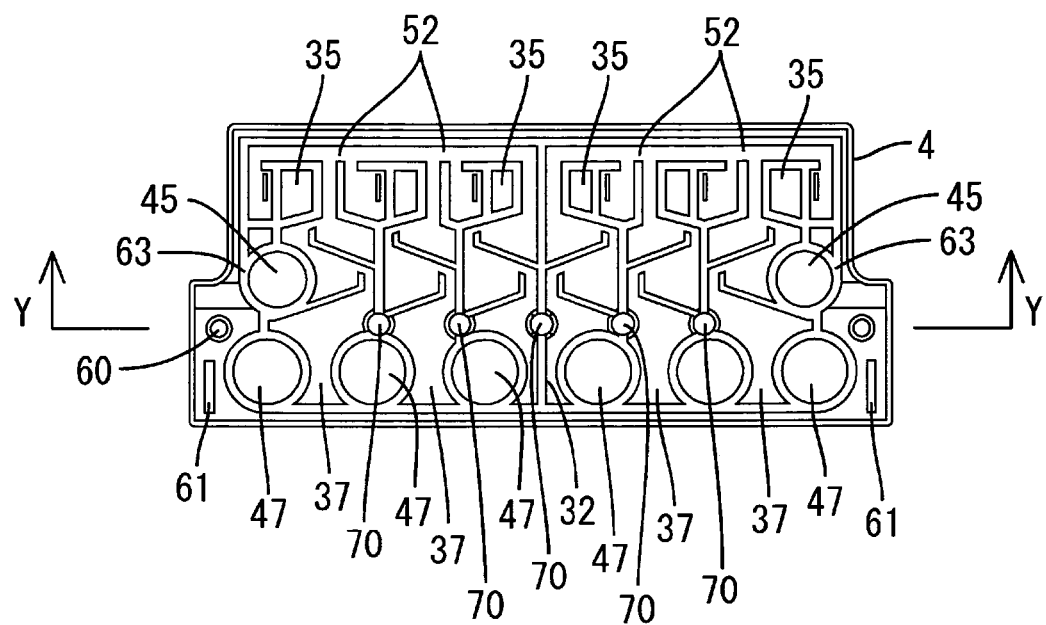
FIG. 11 is a view of a back surface of an upper lid of a lead acid storage battery according to Embodiment 3.
Figure 12:
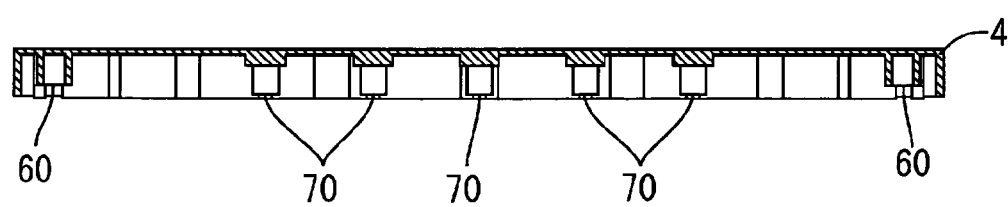
FIG. 12 is a cross-sectional view taken along a line Y-Y in FIG. 11.

The lead acid storage battery 1 according to the present embodiment is explained in reference to FIGS. 11 and 12. FIG. 11 is a back surface view of the upper lid 4, and FIG. 12 is a cross-sectional view taken along a line Y-Y in FIG. 11. The lead acid storage battery 1 according to the present embodiment has 5 porous members 70 made of a porous material and placed on the bottom surface of the upper lid 4, and in that, it is different from the lead acid storage battery 1 in Embodiment 1.

The porous member 70 is respectively placed in a position adjacent to the liquid injection chamber 47 in the intermediate cells (four in the present embodiment), and one porous member 70 is also placed in the central exhaust chamber partition 32 (see FIG. 11). The notched part 52 in accordance with the present embodiment which is provided for the purpose of interconnecting the exhaust chamber 37 and the concentration exhaust chamber 45 in the intermediate cell is formed on the edge in the side of the cell-interconnecting small chamber 35 in the exhaust chamber partition 32.

Meanwhile, in the cell in both edges, similar to the embodiment 1, the porous filter 63 is provided in the concentration exhaust chamber 45 adjacent to the liquid injection chamber 47. This porous filter 63 conventionally has the explosion-proof function, however, in the present invention, it may simultaneously have the same function as the porous member 70 (function for cooling the moisture included in the gas generated within the cell). As a material for the porous member 70, the followings may be employed: an unwoven fabric, a foamed polyethylene, a foamed polypropylene, a glass fiber, a foamed phenol resin, an acrylic fiber, a resin sintered filter, a fluorinated resin filter, a ceramic porous material, a material like the porous filter 63 shown in FIG. 4, and a material exhibiting a cotton form, for example, a material formed from a glass fiber by a papermaking process for the use as a separator in such as a valve regulated lead acid battery (VRLA). In addition, the porous filter 63 and the porous member 70 are not necessarily made of the same material.

Next, the action effect of the present embodiment is explained. Most of the electrolyte mist and moisture vapor mixed in the gas discharged from each the cell is dew-condensed during its passage through the exhaust chamber 37, however, in the cell tending to become high in temperature, moisture in the electrolyte mist and moisture vapor may remain in the gas without being dew-condensed, since more of such as gas than in the cell at lower temperature may generate.

When the gas including the electrolyte mist and moisture vapor moves into other cell at lower temperature through such as the notched part 52 formed in the exhaust chamber partition 32, moisture may dew-condensed in the other cell, and may recirculate within the cell through the electrolyte recirculating port 33. However, the battery according to the present embodiment is provided with the porous member 70 or the porous filter 63 made of porous material of a large surface area as corresponding to each the cell, so that the moisture included in the gas generated within the cell is cooled when passing through the porous member 70 or the porous filter 63 made of porous material of a large surface area. Consequently, the present embodiment allows the heights of the liquid surface to be uniformed among the cells.

(Evaluation Test 1)

The following evaluation test was conducted with respect to: the lead acid storage battery shown in Example 1 (as the high thermal conduction member 10, a stainless steel plate of a thickness of 2 mm, a width of 20 mm, and a length of 256 mm is placed in the above of the position of the cell-interconnecting small chamber 35 in the battery (B24) provided with a middle lid and an upper lid), the lead acid storage battery in Example 5, the lead acid storage battery in Embodiment 2 (hereinafter referred to as Example 6), the lead acid storage battery in Embodiment 3 (hereinafter referred to as Example 7), and a conventional art (which is the same as in Example 1, except not having the member).

The battery in Example 1, the batteries in Examples 5 to 7, and the conventional art are respectively housed in a thermostatic tank at 25 degrees C., and left for 60 minutes to evaluate the temperature change for 60 minutes, with a heater placed in a position 35 cm away from the short side surface of the battery, and with thermocouples attached to the inner surfaces of the upper lid of the cell the closest to the heater (hereinafter referred to as "cell 1") and of the cell the farthest from the heater (hereinafter referred to as "cell 6"). The temperature transition in the cell 1 and the cell 6 in each battery is indicated in FIGS. 13 and 14, while the transition of temperature difference in the cell 1 and the cell 6 is indicated in FIG. 15.

Figure 13:
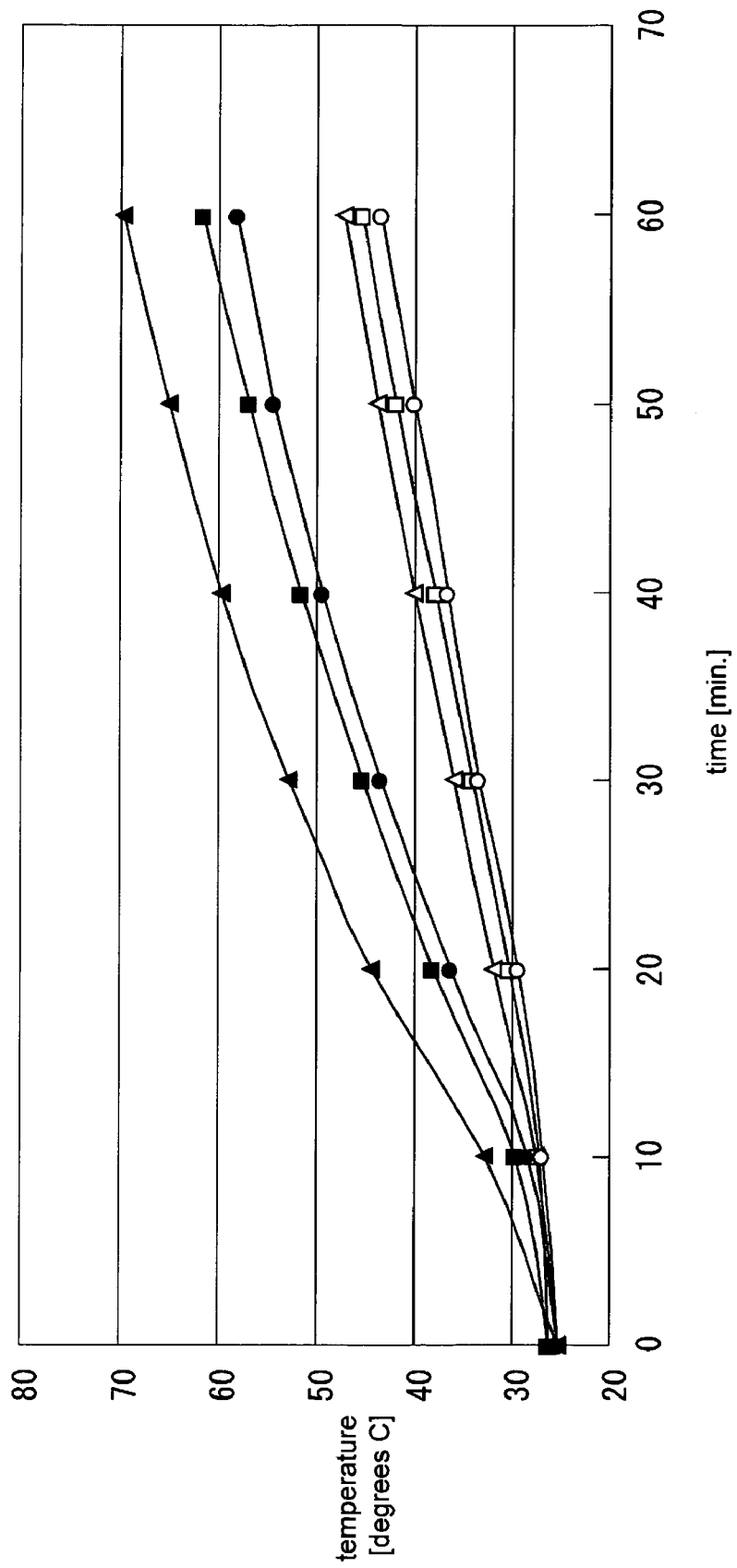
FIG. 13 shows a result of study regarding temperature transition of a cell 1 and a cell 6, with respect to an art of the present invention (Examples 1 and 5) and a conventional art.
Figure 14:
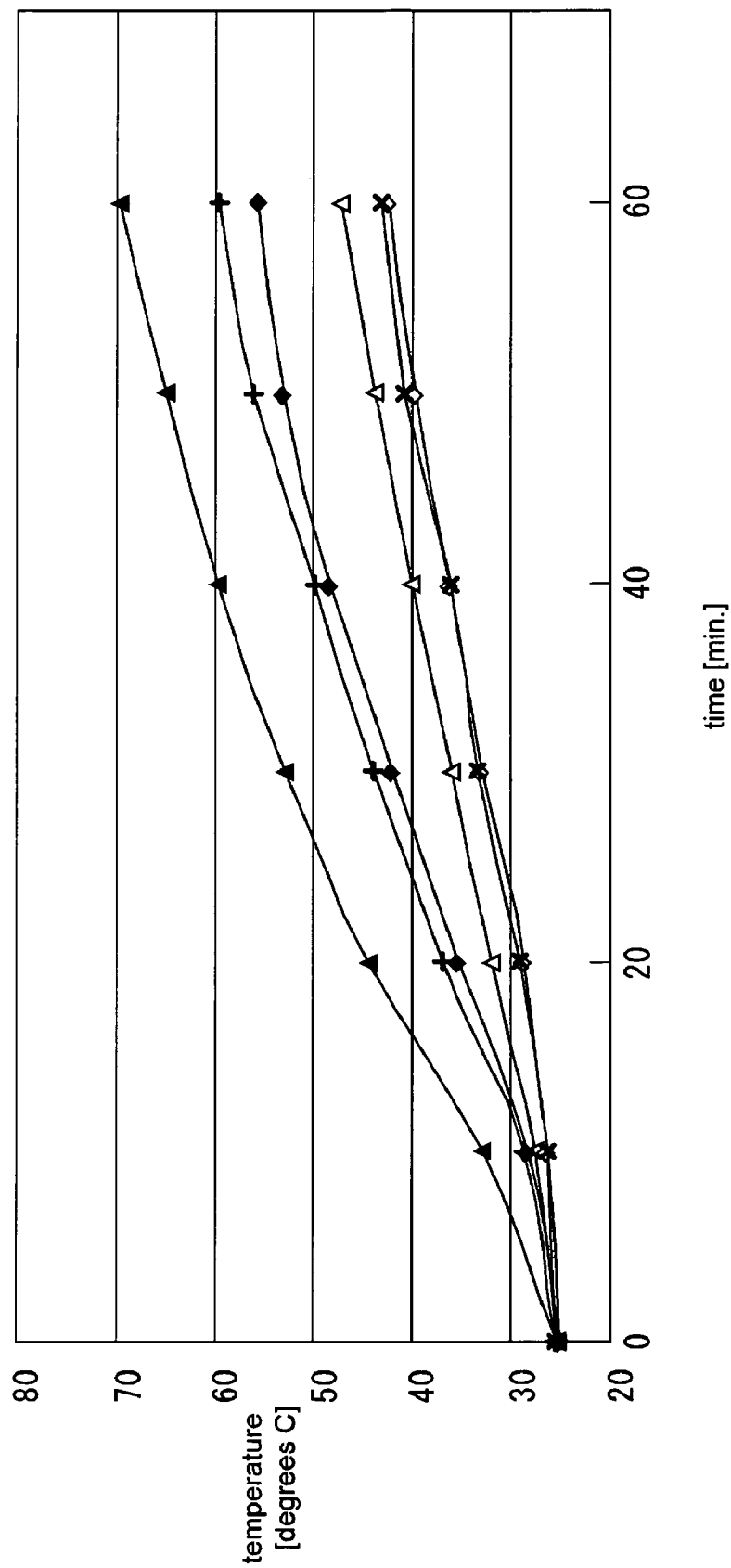
FIG. 14 shows a result of study regarding temperature transition of a cell 1 and a cell 6, with respect to an art of the present invention (Examples 6 and 7) and a conventional art.

As can be understood from FIGS. 13 and 14, the present invention (the lead acid storage battery in Example 1, and in Examples 5 to 7) can suppress the temperature rise in the cell 1 more than the conventional art. Additionally, in Example 1 and in Examples 5 to 7, the suppressing effect against the temperature rise in the cell 1 are almost the same level.

Figure 15:
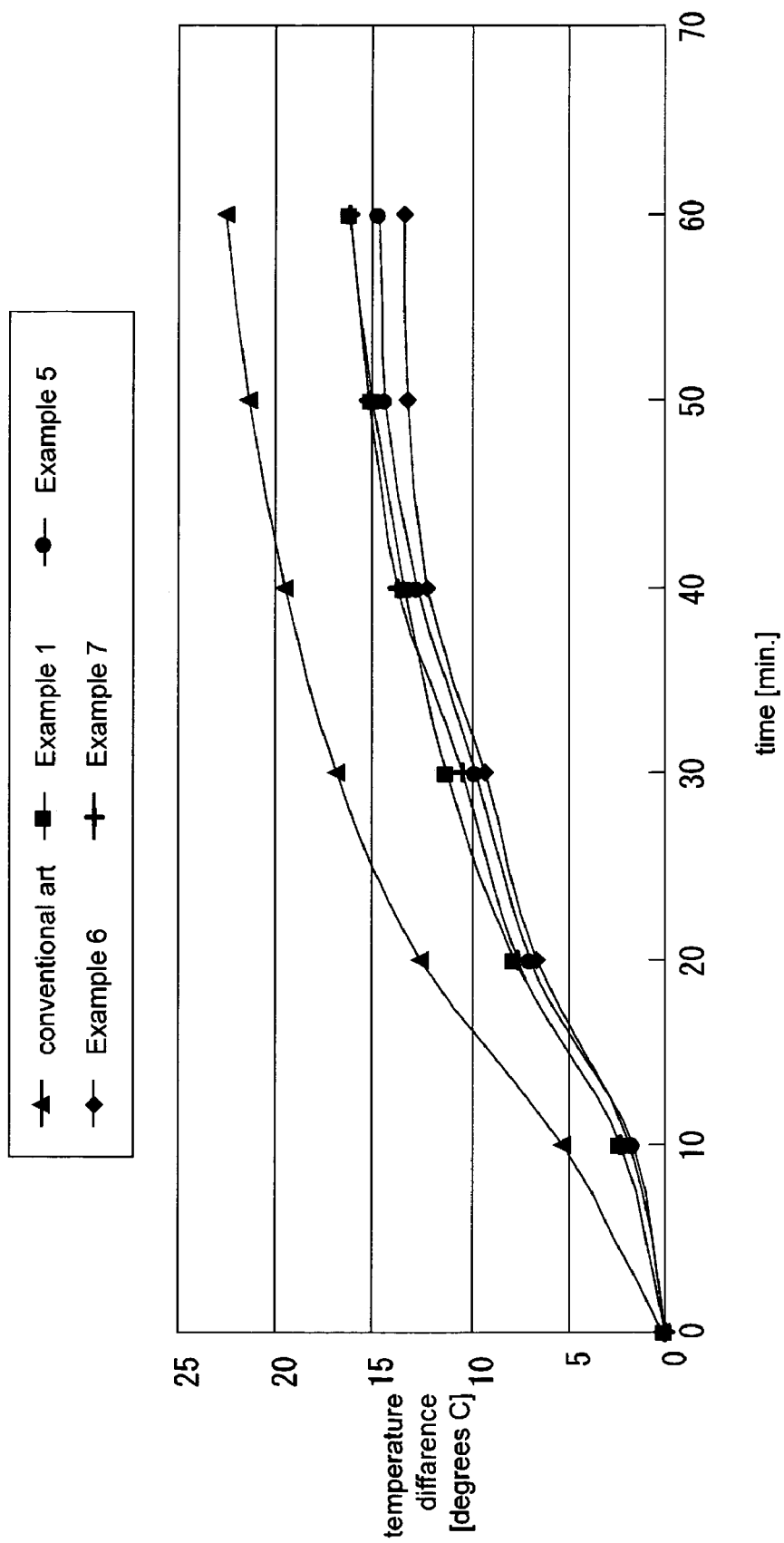
FIG. 15 shows a result of study regarding temperature difference of a cell 1 and a cell 6, with respect to an art of the present invention (Examples 1, and 5 to 7) and a conventional art.

Among the test results shown in FIG. 15, when comparing the battery in Example 1 and the conventional art regarding the temperatures of the cell 1 and the cell 6 as well as the temperature difference thereof after 60 minutes, the temperature in the cell 1 is: 61.3 degrees C. for the battery in Example 1, and 69.5 degrees C. for the conventional art, while the temperature in the cell 6 is: 45.1 degrees C. for the battery in Example 1, and 47.0 degrees C. for the conventional art. The temperature difference is: 16.2 degrees C. for the battery in Example 1, and 22.5 degrees C. for the conventional art, which means less temperature difference between the cell 1 and the cell 6 in the battery in the Example 1 than in the conventional art. In also the battery in Examples 5 to 7, similar to the one in Example 1, the temperature difference between the cell 1 and the cell 6 is smaller than that in the conventional art. Consequently, it can be understood that the present invention is effective against the temperature variation of the upper lid.

(Evaluation Test 2)

Figure 16:
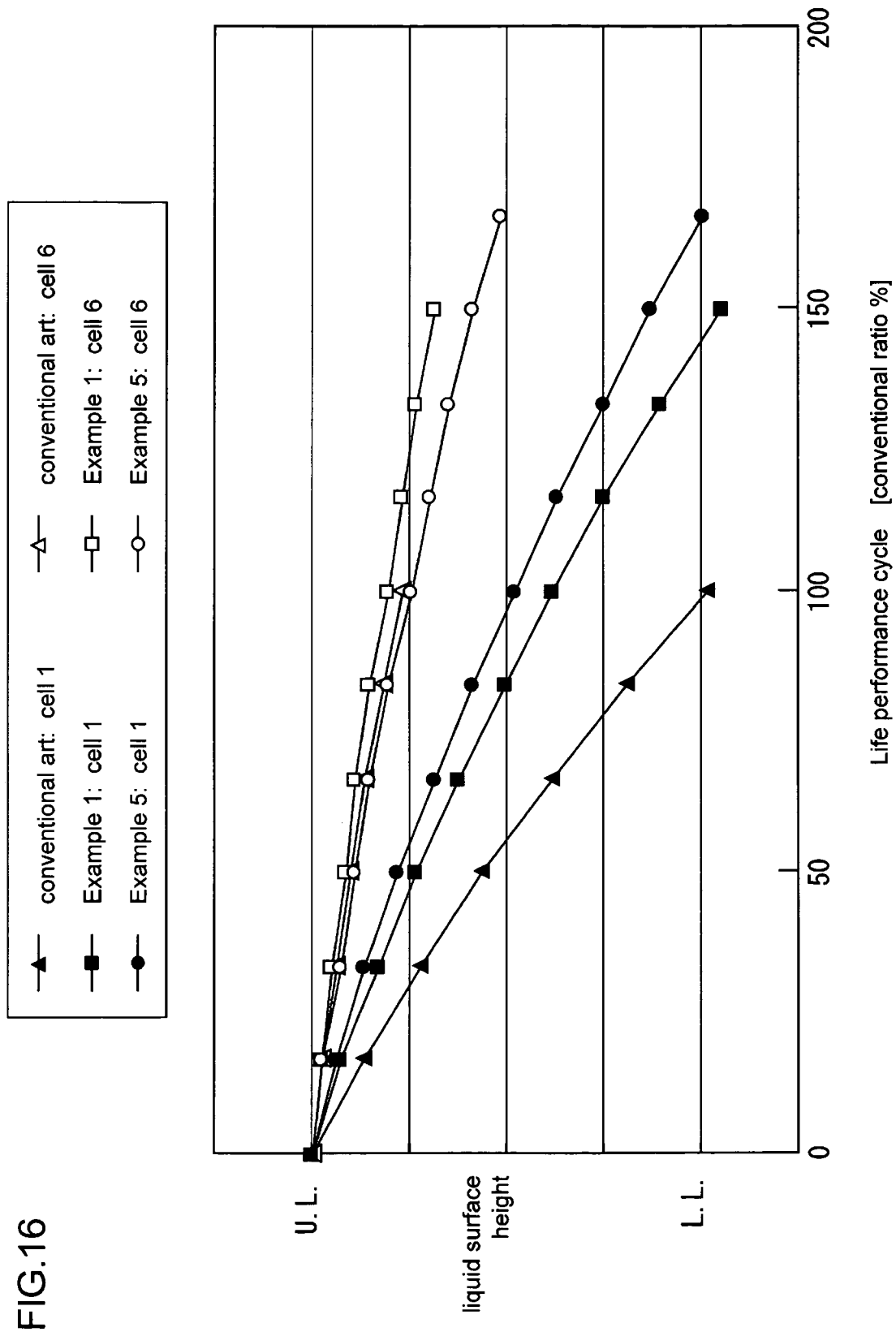
FIG. 16 shows a result of study regarding change of liquid surface in a cell 1 and a cell 6, with respect to an art of the present invention (Examples 1 and 5) and a conventional art.
Figure 17:
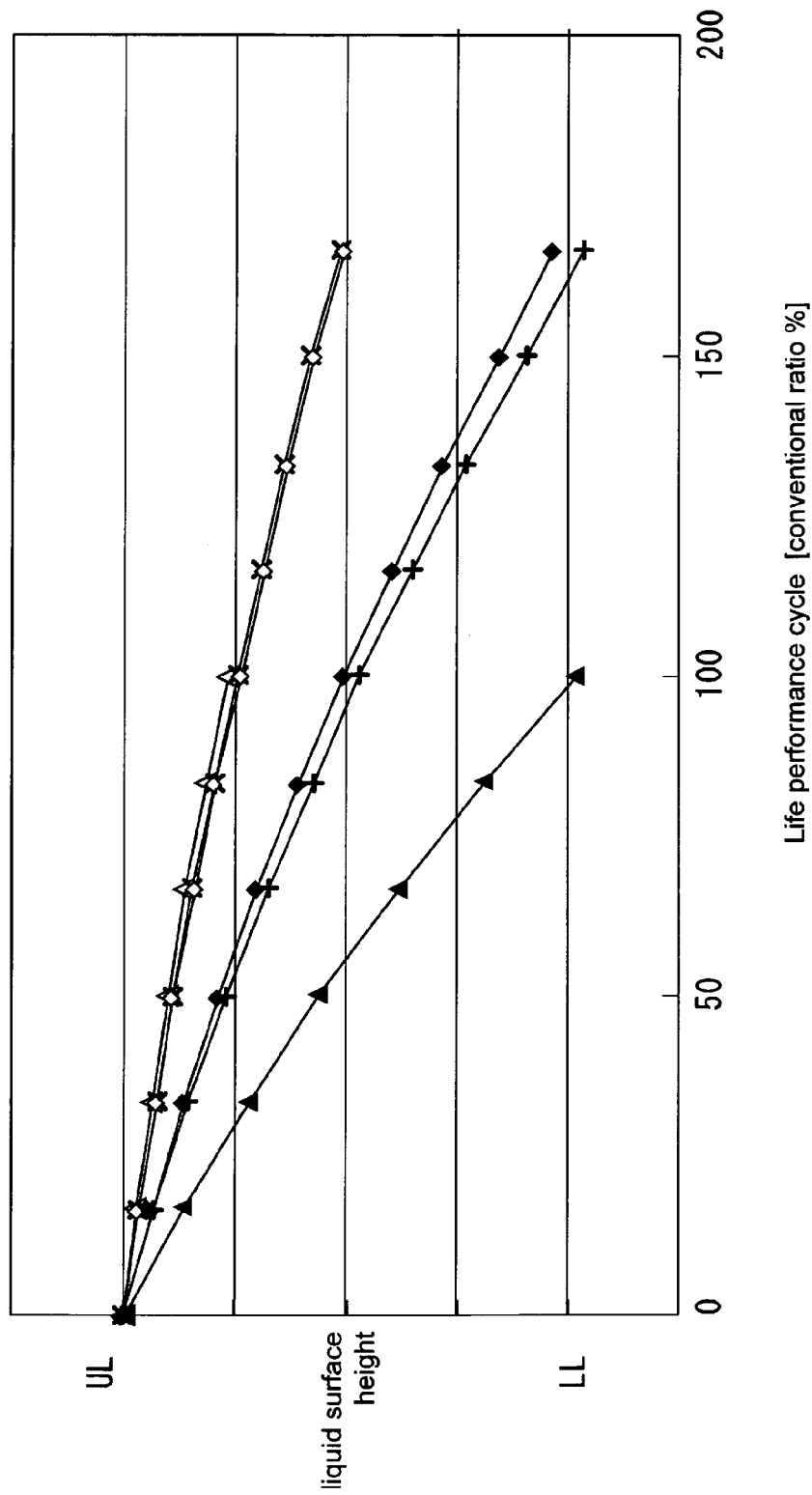
FIG. 17 shows a result of study regarding change of liquid surface in a cell 1 and a cell 6, with respect to an art of the present invention (Examples 6 and 7) and a conventional art.

In the same conditions as Evaluation test 1 excepting the heating by the heater is continuous, a repetitive test was conducted for evaluating the transition of liquid surface in the cells 1 and 6 with respect to each of the batteries, with one cycle set as including the discharge at 25 A for 4 minutes and the constant-voltage charge at 14.8V (maximum current 25 A) for 10 minutes. The results are shown in FIGS. 16 and 17.

Additionally, at the beginning of the test, the cells 1 in both the present invention and the conventional art having the liquid surface at the upper limit level (U.L.) were employed, and tested in regards to the number of cycles when the liquid surface reached the lower limit level (L.L.). FIGS. 16 and 17 indicate the life performance cycle of the arts, with the ratio having the number of cycles when the liquid surface in the cell 1 reached the lower limit level (L.L.) is 100. As can be seen from FIGS. 16 and 17, the life performance cycle of the present invention (Example 1 and Examples 5 to 7) is almost 150, and that means, the conventional art can be extended by 50% in accordance with the present invention.

Other Embodiments (1) In the lead acid storage battery according to the present invention, an aluminum laminate seal may be attached to the surface of the partitions 32, 32', and 32", and/or the partition plates 41 and 42, so that the thermal conductivities of the partitions 32, 32', and 32", and/or the partition plates 41 and 42 increase higher than that of the upper lid. In addition to this, the aluminum laminate seal may also be attached to the inner surface of the upper lid 4. The mixture of a filler having alumina as a main composition described in Example 5, attaching an aluminum laminate seal to the surface of the above-mentioned partitions 32, 32', and 32" and/or the partition plates 41 and 42, and attaching an aluminum laminate seal to the inner surface of the upper lid 4 may be employed independently, however, may also be employed jointly.

(2) In FIG. 7, a protrusion for dissipating heat of the upper lid is formed nearly-vertically to the exhaust chamber partition, however, the shape of the protrusion for dissipating heat of the upper lid is not limited to this.

(3) In the above-mentioned embodiments, on the upper surface of the upper lid corresponding to the part where the protrusion for dissipating heat of the upper lid is formed, a recessed portion is formed in a position corresponding to the protrusion, however, a placing part for a high thermal conduction member on the upper surface of the upper lid may also constitute a flat surface without a recessed portion.

(4) In the above-mentioned embodiments, the porous member is provided one by one in each cell and one in the central partition, however, the size, the number, and the shape of the porous member are not necessarily the same in each cell. In accordance with the place for use and the use condition of the battery, a larger number of the porous member than that in the other cells or the larger porous member may be provided in the cell tending to become high in temperature. For example, in the lead acid storage battery for the use in an engine room, the cells in both ends may be provided with a larger number of the porous member than the central cell or with a larger porous member. Such a configuration is preferred since the leakage of the electrolyte mist and moisture vapor from the cells in both ends that are easily affected by the heat generation from the engine can be effectively suppressed. And also, for example, in a case of a battery that is used under a condition with charging and discharging repeated in a short period of time, the cells in the both ends are easily cooled by the external air, while the intermediate cells being hardly cooled, and thus, the intermediate cells tend to become higher in temperature compared with the cells in both ends. In such a case, it is preferred that a larger number of the porous member or a larger porous member may be provided in the central cell than in the cells in both ends.

(5) In the above-mentioned embodiment, a notched part is provided in order to interconnect the adjacent exhaust chambers, however, a through hole may be provided instead.

(6) In the above-mentioned embodiments, an exhaust chamber is formed in a space between the upper lid and the middle lid, however, in accordance with the present invention, at least an exhaust chamber needs to be formed between the upper lid and the middle lid, and the effect of the present invention may also be obtained by constituting an exhaust chamber by providing a separate member, or by dividing a part of the upper lid or the middle lid.

(7) The structure of the collective exhaust is not limited to the constitution described in the above-mentioned embodiments, and when it is at least a constitution comprising a plurality of cells and an exhaust chamber, the effect of the present invention can be obtained.

The invention claimed is:

1. A lead acid storage battery comprising:
a battery container housing a plurality of cells;
a middle lid arranged so as to cover the battery container; and
an upper lid arranged so as to cover the middle lid,
wherein, on an upper surface of the middle lid, gas discharging ports are formed for discharging gas generated inside of the cells, respectively, and electrolyte recirculating ports are formed for recirculating moisture to be discharged along with the gas within the cells, respectively,
wherein at least a plurality of exhaust chambers are formed in a space surrounded by the middle lid and the upper lid such that adjacent ones of the exhaust chambers are separated by an exhaust chamber partition, the plurality of exhaust chambers being interconnected for collectively exhausting the gas discharged from the gas discharging ports to an outside of the battery,
and wherein at least one of the upper lid and the middle lid comprises a high thermal conduction member and porous members, the high thermal conduction member having a thermal conductivity higher than that of a member composing a wall surface of the exhaust chambers, the porous members being arranged on a bottom surface of the upper lid such that a porous member is provided in each of the cells, the porous members being made of porous material.

2. The lead acid storage battery according to claim 1, wherein a recessed portion is formed on the upper surface of the middle lid, and at least one of a part of the upper lid and a peripheral edge surrounding the recessed portion of the middle lid is provided with the high thermal conduction member.

3. The lead acid storage battery according to claim 1, wherein the number of exhaust chambers formed in the space surrounded by the middle lid and the upper lid is equal to the number of cells, wherein a concentration exhaust chamber is formed in the space surrounded by the middle lid and the upper lid, and wherein a notched part or a through hole is provided in each exhaust chamber partition so as to interconnect adjacent discharging ports such that the gas discharged from the gas discharging ports is converged into the concentration exhaust chamber, and thereby collectively exhausting the converged gas out of the battery.

4. The lead acid storage battery according to claim 2, wherein at least one of a part of the upper lid and a surface of the peripheral edge of the middle lid is provided with the high thermal conduction member.

5. The lead acid storage battery according to claim 2, wherein at least one of a part of the upper lid and the peripheral edge of the middle lid is provided with the high thermal conduction member embedded therein.

6. The lead acid storage battery according to claim 1, wherein, on a bottom surface of the upper lid, a protrusion is formed between adjacent exhaust chamber partitions.

7. The lead acid storage battery according to claim 4, wherein, on a bottom surface of the upper lid, a protrusion is formed between adjacent exhaust chamber partitions.

8. The lead acid storage battery according to claim 5, wherein, on a bottom surface of the upper lid, a protrusion is formed between adjacent exhaust chamber partitions.

9. The lead acid storage battery according to claim 6, wherein, on an upper surface of the upper lid, a recessed portion is formed at a location corresponding to a location where the protrusion is formed on the bottom surface of the upper lid, wherein the high thermal conduction member has an engaging protrusion, and wherein the high thermal conduction member is arranged on the upper surface of the upper lid such that the engaging protrusion engages with the recessed portion of the upper lid.

10. The lead acid storage battery according to claim 7, wherein, on an upper surface of the upper lid, a recessed portion is formed at a location corresponding to a location where the protrusion is formed on the bottom surface of the upper lid, wherein the high thermal conduction member has an engaging protrusion, and wherein the high thermal conduction member is arranged on the upper surface of the upper lid such that the engaging protrusion engages with the recessed portion of the upper lid.

11. The lead acid storage battery according to claim 2, wherein, on a bottom surface of the upper lid, a protrusion is formed between adjacent exhaust chamber partitions.

12. The lead acid storage battery according to claim 3, wherein, on a bottom surface of the upper lid, a protrusion is formed between adjacent exhaust chamber partitions.

* * * * *